United States Patent
Seo et al.

(10) Patent No.: US 10,912,069 B2
(45) Date of Patent: Feb. 2, 2021

(54) METHOD AND APPARATUS FOR TRANSMITTING UPLINK CONTROL INFORMATION IN WIRELESS COMMUNICATION SYSTEM

(71) Applicant: BlackBerry Limited, Waterloo (CA)

(72) Inventors: Dong Youn Seo, Anyang-si (KR); Joon Kui Ahn, Anyang-si (KR); Yun Jung Yi, Anyang-si (KR); Suck Chel Yang, Anyang-si (KR); Bong Hoe Kim, Anyang-si (KR)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/694,779

(22) Filed: Nov. 25, 2019

(65) Prior Publication Data

US 2020/0092878 A1 Mar. 19, 2020

Related U.S. Application Data

(63) Continuation of application No. 15/966,635, filed on Apr. 30, 2018, now Pat. No. 10,492,186, which is a
(Continued)

(51) Int. Cl.
*H04W 72/04* (2009.01)
*H04W 76/10* (2018.01)
(Continued)

(52) U.S. Cl.
CPC ....... *H04W 72/0413* (2013.01); *H04L 1/0026* (2013.01); *H04L 1/0028* (2013.01);
(Continued)

(58) Field of Classification Search
None
See application file for complete search history.

(56) References Cited

U.S. PATENT DOCUMENTS

| 10,492,186 B2 | 11/2019 | Seo et al. | |
| 2011/0081936 A1* | 4/2011 | Haim | H04W 52/30 455/522 |

(Continued)

FOREIGN PATENT DOCUMENTS

| CN | 102045827 | 5/2011 |
| EP | 2706795 | 3/2014 |

(Continued)

OTHER PUBLICATIONS

LG Electronics, "Remaining Issues on UCI Transmission on PUCCH" 3GPP TSG RAN WG1 Meeting #64, R1-110880, Feb. 25, 2011, 4 pages.
(Continued)

*Primary Examiner* — Shripal K Khajuria
(74) *Attorney, Agent, or Firm* — Fish & Richardson P.C.

(57) ABSTRACT

Provided are a method for a terminal transmitting uplink control information (UCI) through a physical uplink control channel (PUCCH) in a wireless communication system, and a terminal using the method. A transmission power to be applied to the uplink control channel is determined on the basis of a value subordinate to a PUCCH format, and at least one type of UCI is transmitted from the physical uplink control channel by using the transmission power that is determined, wherein when the PUCCH format is PUCCH format 3, and the at least one type of UCI includes acknowledgement/negative-acknowledgement (ACK/NACK) and periodic channel state information (CSI), the value subordinate to the PUCCH format is determined on the basis of the number of bits of the ACK/NACK and the number of bits of the periodic CSI.

12 Claims, 17 Drawing Sheets

Related U.S. Application Data continuation of application No. 15/641,987, filed on Jul. 5, 2017, now Pat. No. 9,999,035, which is a continuation of application No. 15/265,591, filed on Sep. 14, 2016, now Pat. No. 9,730,199, which is a continuation of application No. 14/374,209, filed as application No. PCT/KR2013/000633 on Jan. 25, 2013, now Pat. No. 9,467,984.

(60) Provisional application No. 61/591,281, filed on Jan. 27, 2012, provisional application No. 61/635,828, filed on Apr. 19, 2012, provisional application No. 61/650,985, filed on May 23, 2012, provisional application No. 61/668,428, filed on Jul. 5, 2012, provisional application No. 61/678,620, filed on Aug. 1, 2012.

(51) Int. Cl.
| | | |
|---|---|---|
| *H04L 5/00* | (2006.01) | |
| *H04L 27/26* | (2006.01) | |
| *H04L 1/00* | (2006.01) | |
| *H04L 1/16* | (2006.01) | |
| *H04W 52/14* | (2009.01) | |
| *H04W 72/12* | (2009.01) | |
| *H04W 52/32* | (2009.01) | |

(52) U.S. Cl.
CPC ............ *H04L 1/1671* (2013.01); *H04L 5/001* (2013.01); *H04L 5/0055* (2013.01); *H04L 5/0057* (2013.01); *H04L 27/2628* (2013.01); *H04W 52/146* (2013.01); *H04W 72/1284* (2013.01); *H04W 76/10* (2018.02); *H04W 52/325* (2013.01)

(56) References Cited

U.S. PATENT DOCUMENTS

| | | | | |
|---|---|---|---|---|
| 2011/0275403 | A1* | 11/2011 | Chen | H04W 52/325 |
| | | | | 455/522 |
| 2011/0319120 | A1 | 12/2011 | Chen et al. | |
| 2013/0128833 | A1* | 5/2013 | Lee | H04W 52/545 |
| | | | | 370/329 |
| 2017/0006601 | A1 | 1/2017 | Seo et al. | |
| 2017/0303271 | A1* | 10/2017 | Seo | H04L 5/001 |

FOREIGN PATENT DOCUMENTS

| | | |
|---|---|---|
| JP | 1852166 | 1/2011 |
| KR | 10-2011-0018790 | 2/2011 |
| KR | 10-2011-0027591 | 3/2011 |
| KR | 10-2011-0051156 | 5/2011 |
| KR | 10-2011-0123199 | 11/2011 |
| WO | 2008042187 | 4/2008 |
| WO | 2010091425 | 6/2010 |
| WO | 2011041700 | 4/2011 |
| WO | 2011112004 | 9/2011 |
| WO | 2011145890 | 11/2011 |
| WO | 2012008815 | 1/2012 |

OTHER PUBLICATIONS

Office Action issued in Chinese Application No. 201710310902.9 dated Mar. 5, 2020, 6 pages (With English Translation).

Samsung, "HARQ-ACK and Periodic CSI Multiplexing in PUCCH for DL CA," 3GPP TSG RAN WG1 #67, R1-114208, Nov. 8, 2011, 4 pages.

ZTE, "Remaining Issues of UL Channel Combinations for Rel-10", 3GPP TSG RAN WG1 Meeting #64, R1-110808, Feb. 15, 2011, 6 pages.

LG Electronics, "Remaining issues of multi-cell HARQ-ACK and periodic CSI on PUCCH format 3," 3GPP TSG RAN NG1 Meeting #?Obis, R1-124309, Sep. 29, 2012, 4 pages.

Korean Intellectual Property Office Application No. 10-2014-7019472, Office Action dated Feb. 24, 2016, 4 pages.

3rd Generation Partnership Project {3GPP), "Technical Specification Group Radio Access Network; Evolved Universal Terrestrial Radio Access {E-UTRA); Physical layer procedures {Release 10)," 3GPP TS 36.213 V10.4.0, Dec. J011 , 125pages.

LG Electronics, "Simultaneous Transmission of HARQ-ACK and CSI on PUCCH Format 3," 3GPP TSG RAN WG1 Meeting #67, R1-113904, Nov. 2011, 4 pages.

Japan Patent Office Application No. 2014-554665, Office Action dated Aug. 12, 2015, 3pages.

3rd Generation Partnership Project {3GPP), "Technical Specification Group Radio Access Network; Evolved Universal Terrestrial Radio Access {E-UTRA); Physical Channels and Modulation {Release 8)," 3GPP TS 36.211 V8.2.0, KP050377534, Mar. 2008, 65 pages.

3rd Generation Partnership Project {3GPP), "Technical Specification Group Radio Access Network; Evolved Universal Terrestrial Radio Access {E-UTRA); Physical Channels and Modulation {Release 10)," 3GPP TS 36.211 V10.0.0, KP050462365, Dec. 2010, 103 pages.

3rd Generation Partnership Project {3GPP), "Technical Specification Group Radio Access Network; Evolved Universal Terrestrial Radio Access {E-UTRA); Physical layer procedures {Release 10)," 3GPP TS 36.213 V10.4.0, KP050555014, Dec. 2011, 125 pages.

ZTE, "Power control of PUCCH for LTE-A TDD," 3GPP TSG-RAN WG1 #65, R1-111506, XP050491183, May 2011, 4 pages.

ZTE, "Power Control of PUCCH for LTE-A TDD," 3GPP TSG-RAN WG1 #63bis, R1-110168, XP050490104, Jan. 2011, 3 pages.

Ericsson, et al., "Power control for PUCCH format 3 with SORTO," 3GPP TSG RAN WG1 Meeting #63bis, R1-110028, KP050474300, Jan. 2010, 3 pages.

An, "Dual RM segmentation and format 3 power control," 3GPP TSG RAN WG1 Meeting #63bis R1-110045, KP050490024, Jan. 2011, 5 pages.

Alcatel-Lucent, et al., "R1-110556: Power Control for PUCCH format 3," 3GPP TSG RAN WG1 Meeting #63bis, R1-110556, XP050599087, Jan. 2011, 5 pages.

Catt et al., "Way Forward on PUCCH format 3 Power Control in Rel-10," TSG RAN WG1 Meeting #63bis, R1-110575, XP050599099, Jan. 2011, 4 pages.

LG Electronics, "Correction on PUCCH Power Control," 3GPP TSG-RAN WG1 Meeting #73, R1-132217, KP050697989, May 2013, 5 pages.

European Patent Office Application Serial No. 13740670.8, Search Report dated Jul. 9, 2015, 19 pages.

PCT International Application No. PCT/KR2013/000633, Written Opinion of the International Searching Authority dated May 7, 2013, 1 page.

Extended European Search Report issued in European Application No. 19164899.7, dated Jul. 22, 2019, 12 pages.

Office Action issued in Chinese Application No. 201710310902.9 dated Sep. 19, 2019, 8 pages.

\* cited by examiner

METHOD AND APPARATUS FOR TRANSMITTING UPLINK CONTROL INFORMATION IN WIRELESS COMMUNICATION SYSTEM

CROSS-REFERENCE TO RELATED APPLICATIONS

This application is a continuation of U.S. patent application Ser. No. 15/966,635, filed Apr. 30, 2018, currently pending, which is a continuation of U.S. patent application Ser. No. 15/641,987, filed on Jul. 5, 2017, now U.S. Pat. No. 9,730,199, which is a continuation Ser. No. 15/265,591, filed on Sep. 14, 2016, now U.S. Pat. No. 9,730,199, which is a continuation of U.S. patent application Ser. No. 14/374,209, filed on Jul. 23, 2014, now U.S. Pat. No. 9,467,984, which is the National Stage filing under 35 U.S.C. 371 of International Application No. PCT/KR2013/000633, filed on Jan. 25, 2013, which claims the benefit of U.S. Provisional Application No. 61/591,281, filed on Jan. 27, 2012, 61/635,828, filed on Apr. 19, 2012, 61/650,985, filed on May 23, 2012, 61/668,428, filed on Jul. 5, 2012, and 61/678,620, filed on Aug. 1, 2012, the contents of which are all hereby incorporated by reference herein in their entirety.

BACKGROUND OF THE INVENTION

Field of the Invention

The present invention relates to wireless communication, and more particularly, to a method and an apparatus for transmitting uplink control information in a wireless communication system.

Related Art

In a wideband wireless communication system, effective transmission and reception techniques and utilization measures have been proposed in order to maximize efficiency of limited radio resources. One of systems considered as a next-generation wireless communication system is an orthogonal frequency division multiplexing (OFDM) system that can attenuate an inter-symbol interference (ISI) effect with low complexity. In the OFDM, a data symbol input in series is converted into N parallel data symbols which are loaded on N separated subcarriers to be transmitted, respectively. The subcarriers maintain orthogonality in respect of a frequency. Respective orthogonal channels undergo independent frequency selective fading, and as a result, complexity in a receiver is decreased and an interval of transmitted symbols is increased to minimize inter-symbol interference.

Orthogonal frequency division multiple access (hereinafter, referred to as OFDMA) represents a multiple access method that implements a multiple access by independently some of usable subcarriers to each user in a system using the OFDM as a modulation scheme. The OFDMA provides frequency resources such as the subcarriers to each user and the respective frequency resources are independently provided to a plurality of users not to be overlapped with each other, in general. Consequently, the frequency resources are exclusively allocated for each user. In the OFDMA system, frequency diversity for multiple users may be acquired through frequency selective scheduling and the subcarriers may be allocated in various patterns according to a permutation scheme for the subcarriers. In addition, efficiency of a spatial area may be increased by a space multiplexing technique using multiple antennas.

Multiple-input multiple-output (MIMO) technology improves transmission and reception efficiency of data by using multiple transmitting antennas and multiple receiving antennas. A technique for implementing diversity in an MIMO system includes a space frequency block code (SFBC), a space time block code (STBC), cyclic delay diversity (CDD), frequency switched transmit diversity (FSTD), time switched transmit diversity (TSTD), precoding vector switching (PVS), spatial multiplexing (SM), and the like. An MIMO channel matrix depending on the number of receiving antennas and the number of transmitting antennas may be dissolved into a plurality of independent channels. The respective independent channels are called layers or streams. The number of layers represents a rank.

Uplink control information (UCI) may be transmitted through a physical uplink control channel (PCCH). The uplink control information may include various types of information including a scheduling request (SR), an acknowledgement/non-acknowledgement (ACK/NACK) signal, a channel quality indicator (CQI), a precoding matrix indicator (PMI), a rank indicator (RI), and the like. The PUCCH transports various types of control information according to a format.

In recent years, a carrier aggregation system attracts attention. The carrier aggregation system means a system that configures the wide band by collecting one or more subcarriers having a smaller bandwidth than a target wide band when the wireless communication system supports the wide band.

In the carrier aggregation system, a method for efficiently and reliably transmitting various types of uplink control information is required. In particular, when the periodic CSI (for example, CQI) and the ACK/NACK are simultaneously transmitted in the same subframe, it may be problematic by which scheme the transmission power is determined.

SUMMARY OF THE INVENTION

The present invention provides a method and an apparatus for transmitting uplink control information in a wireless communication system.

In one aspect, provided is a method for transmitting, by user equipment, uplink control information (UCI) through a physical uplink control channel (PUCCH) in a wireless communication system. The method includes the steps of determining, based on a value subordinate to a PUCCH format divided according to a modulation scheme and the number of bits in a subframe, transmission power to be applied to an uplink control channel of the subframe; and transmitting at least one type of UCI at the determined transmission power in the uplink control channel, wherein when the PUCCH format uses quadrature phase shift keying as the modulation scheme, the PUCCH format is PUCCH format 3 in which the number of bits transmitted in the subframe is 48 bits, and at least one of UCI includes an acknowledgement/not-acknowledgement (ACK/NACK) and periodic channels state information (CSI), the PUCCH format dependent value is determined based on the number of bits of the ACK/NACK and the number of bits of the periodic CSI.

In another aspect, provided is user equipment. The user equipment includes: a radio frequency (RF) unit transmitting or receiving a radio signal; and a processor connected with the RF unit, wherein the processor determines, based on a value subordinate to a PUCCH format divided according to a modulation scheme and the number of bits in a subframe, transmission power to be applied to an uplink control channel of the subframe and transmits at least one type of UCI at the determined transmission power in the uplink control channel, and wherein when the PUCCH format uses quadrature phase shift keying as the modulation scheme, the PUCCH format is PUCCH format 3 in which the number of bits transmitted in the subframe is 48 bits, and at least one of UCI includes an acknowledgement/not-acknowledgement (ACK/NACK) and periodic channels state information (CSI), the PUCCH format dependent value is determined based on the number of bits of the ACK/NACK and the number of bits of the periodic CSI.

When different types of uplink control information (UCI) needs to be transmitted in the same subframe, transmission power can be efficiently determined. In particular, when periodic CSI and an ACK/NACK are simultaneously through a PUCCH, the transmission power is determined by considering the numbers of bits of the periodic CSI and the ACK/NACK, the UCI can be transmitted with reliability as compared with the related art.

DESCRIPTION OF EXEMPLARY EMBODIMENTS

Figure 1:
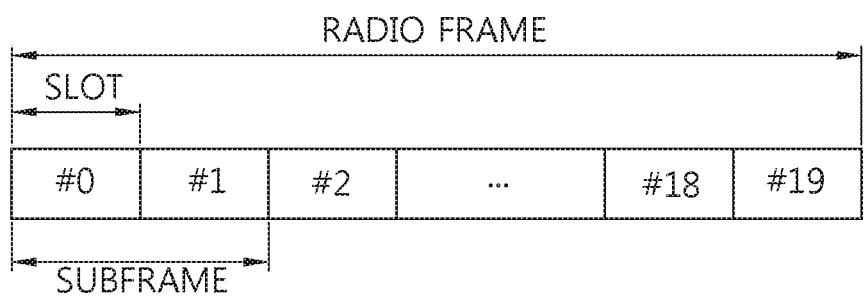
FIG. 1 illustrates a structure of a radio frame in 3GPP LTE.

Technology described below may be used in various wireless communication systems including code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. IEEE 802.16m as the evolution of IEEE 802.16e provides backward compatibility with a system based on the IEEE 802.16e. The UTRA is a part of a universal mobile telecommunication system (UMTS). $3^{rd}$ generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE. The LTE/LTE-A is primarily described for clear description, but the spirit of the present invention is not limited thereto.

The wireless communication system includes at least one base station (BS). Each base station provides a communication service to a specific geographical region. User equipment (UE) may be fixed or movable and may be called other terms such as a mobile station (MS), a mobile terminal (MT), a user terminal (UT), a subscriber station (SS), a wireless device, a personal digital assistant (PDA), a wireless modem, a handheld device, and the like. The base station generally represents a fixed station that communicates with a terminal, and may be called different terms such as an evolved-NodeB (eNB), a base transceiver system (BTS), an access point, and the like.

The user equipment generally belongs to one cell and the cell to which the terminal belong is referred to as a serving cell. A base station that provides the communication service to the serving cell is referred to as a serving BS. The serving base station may provide one or a plurality of serving cells.

The technology may be used in a downlink or an uplink. In general, the downlink means communication from the base station to the terminal and the uplink means communication from the terminal to the base station.

Layers of a radio interface protocol between the terminal and the base station may be divided into a first layer (L1), a second layer (L2), and a third layer (L3) based on three lower layers of an open system interconnection (OSI) model which is widely known in a communication system.

A physical layer as the first layer is connected with a medium access control (MAC) layer which is a higher layer through a transport channel and data moves between the MAC layer and the physical layer through the transport channel. In addition, data moves between different physical layers, that is, between physical layers at a transmitter and a receiver through a physical channel.

A radio data link layer as the second layer is constituted by the MAC layer, an RLC layer, and a PDCP layer. The MAC layer as a layer that takes charge of mapping a logic channel and the transport channel selects an appropriate transport channel in order to transmit data transferred from the RLC layer and adds required control information to a header of an MAC protocol data unit (PDU).

The RLC layer is positioned on a layer upper than the MAC layer to support reliable transmission of data. Further, the RLC layer segments and concatenates RLC service data units (SDUs) transferred from the higher layer in order to configure data having an appropriate size suitable for a radio interval. The RLC layer of a receiver supports a reassembling function of data in order to restore an original RLC SDU from the received RLC PDUs.

The PDCP layer is used only in a packet exchange area and a header of an IP packet may be compressed and transmitted so as to increase transmission efficiency of packet data in a radio channel.

The RRC layer as the third layer serves to control a lower layer and exchanges radio resource control information between the user equipment and a network. Various RRC statuses including an idle mode an RRC connected mode, and the like are defined according to a communication status of the user equipment and transition between the RRC statuses is possible as necessary. In the RRC layer, various procedures associated with radio resource management are defined, which include system information broadcasting, an RRC access management procedure, a multiple component carrier configuring procedure, a radio bearer controlling procedure, a security procedure, a measurement procedure, a mobility management procedure (handover), and the like.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of antennas and one receive antenna. The SISO system uses one antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

FIG. 1 illustrates a structure of a radio frame in 3GPP LTE.

This may refer to section 5 of 3rd Generation Partnership Project (3GPP) TS 36.211 V8.2.0 (2008-03) "Technical Specification Group Radio Access Network; Evolved Universal Terrestrial Radio Access (E-UTRA); Physical channels and modulation (Release 8)". Referring to FIG. 1, the radio frame is constituted by 10 subframes and one subframe is constituted by 2 slots. Slots in the radio frame are numbered with slots numbers of #0 to #19. A time required to transmit one subframe is referred to as a transmission time interval (TTI). The TTI may be a scheduling unit for data transmission. For example, the length of one frame may be 10 ms, the length of one subframe may be 1 ms, and the length of one slot may be 0.5 ms.

One slot includes a plurality of orthogonal frequency division multiplexing (OFDM) symbols in a time domain and includes a plurality of subcarriers in a frequency domain. Since the 3GPP LTE uses the OFDMA in the downlink, the OFDM symbol is used to express one symbol period and may be called other name according to a multiple access scheme. For example, when SC-FDMA is used as an uplink multiple access scheme, the OFDM symbol may be called an SC-FDMA symbol. A resource block (RB) includes a plurality of contiguous subcarriers in one slot as a resource allocation unit. The structure of the radio frame is just one example. Accordingly, the number of subframes included in the radio frame, the number of slots included in the subframe, or the number of OFDM symbols included in the slot may be variously changed.

The 3GPP LTE defines that one slot includes 7 OFDM symbols in a normal cyclic prefix (CP) and one slot includes 6 OFDM symbols in an extended CP.

The wireless communication system may be generally divided into a frequency division duplex (FDD) scheme and a time division duplex (TDD) scheme. According to the FDD scheme, uplink transmission and downlink transmission are performed while occupying different frequency bands. According to the TDD scheme, the uplink transmission and the downlink transmission are performed at different timings while occupying the same frequency band. A channel response of the TDD scheme is substantially reciprocal. This means that a downlink channel response and an uplink channel response are almost the same as each other in a given frequency domain. Accordingly, in the wireless communication system based on the TDD, the downlink channel response may be acquired from the uplink channel response. In the TDD scheme, since an entire frequency band is time-divided into the uplink transmission and the downlink transmission, the downlink transmission by the base station and the uplink transmission by the terminal may not simultaneously be performed. In the TDD system in which the uplink transmission and the downlink transmission are divided by the unit of the subframe, the uplink transmission and the downlink transmission are performed in different subframes. In the TDD scheme, the uplink subframe and the downlink subframe coexist in one frame and the configuration is determined by an uplink-downlink configuration. The UL-DL configuration may refer to Table 4.2.2 of 3GPP TS 36.211 V10.0.0.

Figure 2:
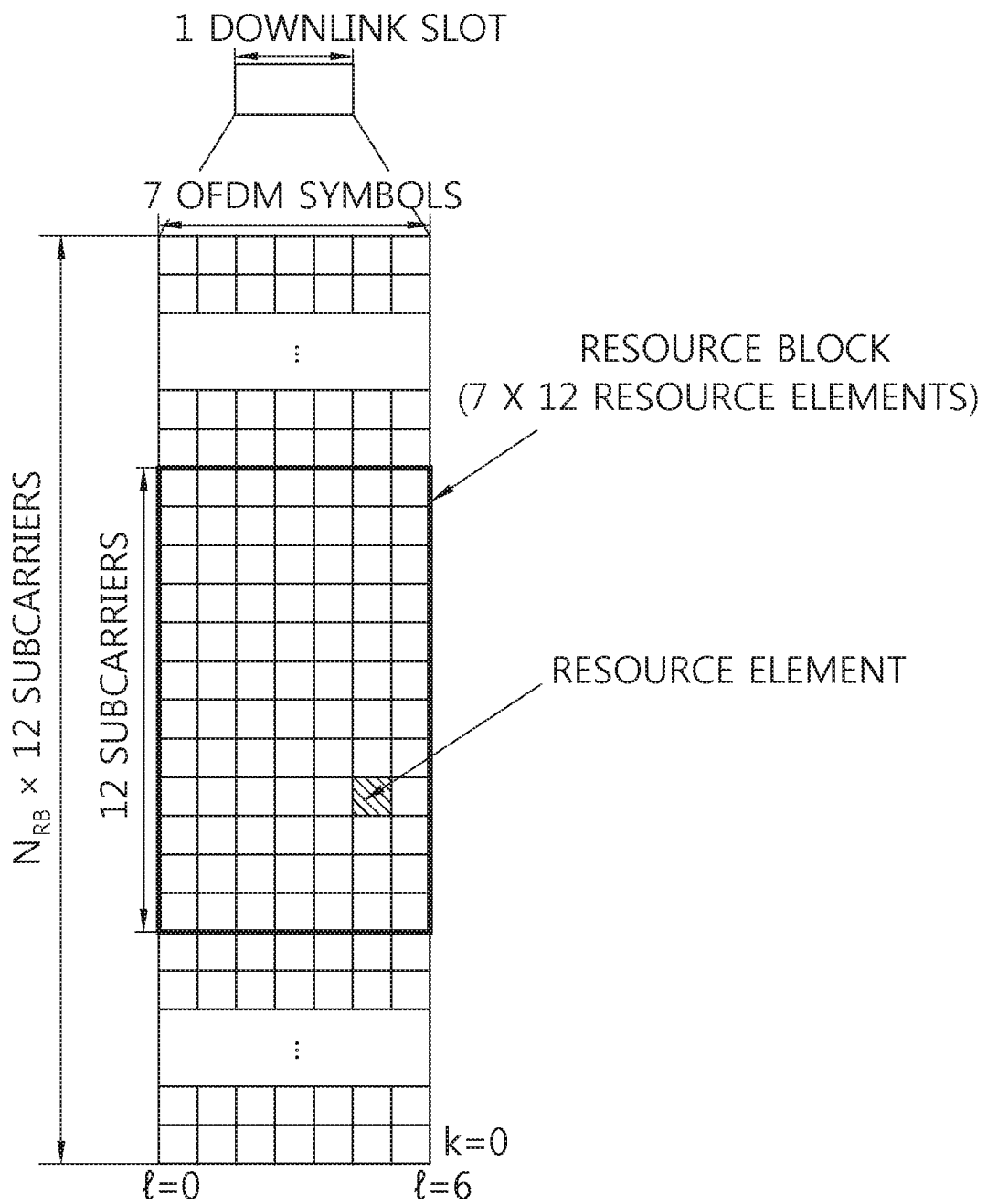
FIG. 2 illustrates one example of a resource grid for one downlink slot.

FIG. 2 illustrates one example of a resource grid for one downlink slot.

The downlink slot includes a plurality of OFDM symbols in the time domain and includes $N_{RB}$ resource blocks in the frequency domain. The number $N_{RB}$ of resource blocks included in the downlink slot is subordinate to a downlink bandwidth $N^{DL}$ set in a cell. For example, in an LTE system, $N_{RB}$ may be any one of 6 to 110. One resource block includes a plurality of subcarriers in the frequency domain. A structure of an uplink slot may also be the same as that of the downlink slot.

Each element on the resource grid is called a resource element (RE). The resource element on the resource grid may be identified by a pair of indexes (k,l) in the slot. Herein, k (k=0, . . . , $N_{RB} \times 12-1$) represents a subcarrier index in the frequency domain and l (l=0, . . . , 6) represents an OFDM symbol index in the time domain.

Herein, it is exemplarily described that one resource block is constituted by 7 OFDM symbols in the time domain and 12 subcarriers in the frequency domain and thus includes 7×12 resource elements, but the number of the OFDM symbols and the number of the subcarriers in the resource block are not limited thereto. The number of the OFDM symbols and the number of the subcarriers may be variously changed depending on the length of a CP, frequency spacing, and the like. For example, in the case of a normal cyclic prefix (CP), the number of OFDM symbols is 7 and in the case of an extended cyclic prefix (CP), the number of OFDM symbols is 6. As the number of subcarriers in one OFDM symbol, one may be selected and used among 128, 256, 512, 1024, 1536, and 2048.

Figure 3:
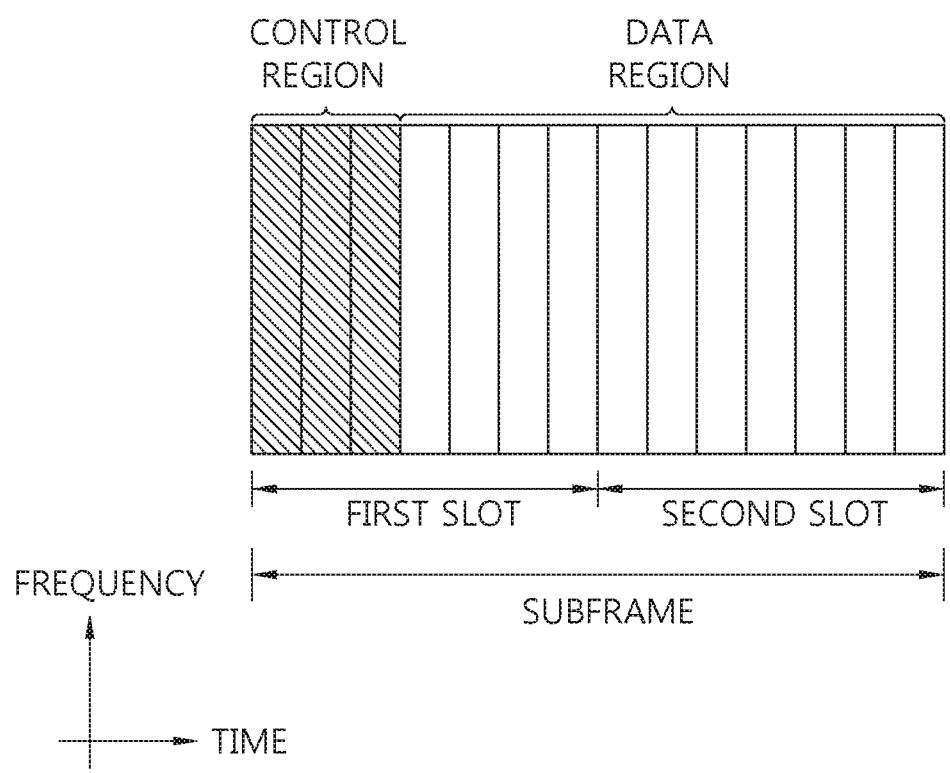
FIG. 3 illustrates a structure of a downlink subframe.

FIG. 3 illustrates a structure of a downlink subframe.

The downlink subframe includes two slots in the time domain and each slot includes seven OFDM symbols in the normal CP. Preceding maximum 3 OFDM symbols (maximum 4 OFDM symbols for a 1.4 Mhz bandwidth) of a first slot in the subframe are a control region to which control channels are allocated and residual OFDM symbols become a data region to which a physical downlink shared channel (PDSCH) is allocated.

A PUCCH may transport resource allocation and a transmission format of a downlink-shared channel, resource allocation information of an uplink shared channel, paging information on a PCH, system information on the DL-SCH, resource allocation of a higher layer control message such as a random access response transmitted on the PDSCH, a set of transmission power control commands for individual UEs in a predetermined UE group, and activation of voice over Internet protocol (VoIP). A plurality of PDCCHs may be transmitted in the control region and the terminal may monitor the plurality of PDCCHs. The PDCCH is transmitted on aggregation of one or several contiguous control channel elements (CCEs). The CCE is a logical allocation unit used to provide to the PDCCH coding rate depending on a state of a radio channel. The CCEs correspond to a plurality of resource element groups. A format of the PDCCH and the bit number of an available PDCCH are determined according to a correlation of the number of CCEs and the coding rate provided by the CCEs.

The base station determines the PDCCH format according to the downlink control information (DCI) to be sent to the user equipment and affixes a cyclic redundancy check (CRC) to the control information. A unique identifier (radio network temporary identifier (RNTI)) is masked on the CRC according to an owner or a purpose of the PDCCH. In the case of a PDCCH for a specific terminal, a unique identifier of the terminal, for example, a cell (C)-RNTI may be masked on the CRC. Alternatively, in the case of a PDCCH for a paging message, a paging indication identifier, for example, a paging (P)-RNTI may be masked on the CRC. In the case of a PDCCH for a system information block (SIB), system information (SI)-RNTI may be masked on the CRC. A random access (RA)-RNTI may be masked on the CRC in order to indicate the random access response which is a response to transmission of a random access preamble of the terminal.

Figure 4:
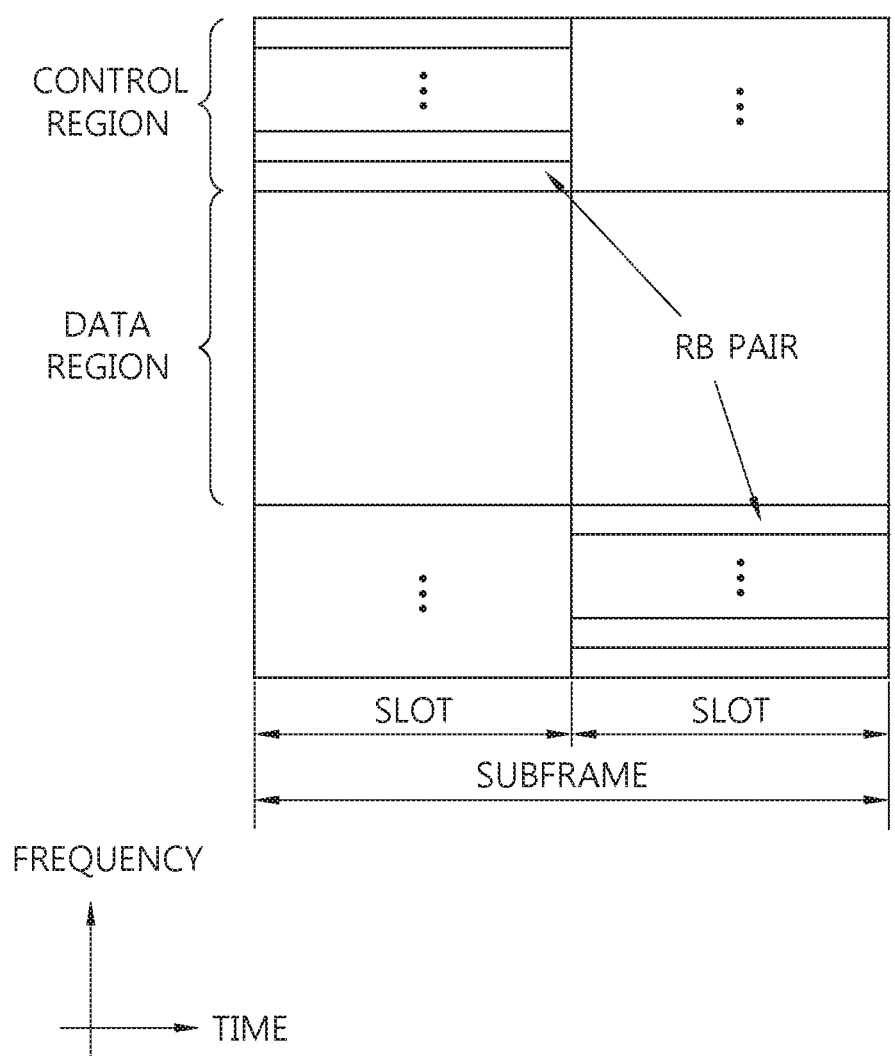
FIG. 4 illustrates a structure of an uplink subframe.

FIG. 4 illustrates a structure of an uplink subframe.

The uplink subframe may be divided into a control region and a data region in the frequency domain. The physical uplink control channel (PUCCH) for transmitting the uplink control information is allocated to the control region. The physical uplink shared channel (PUSCH) for transmitting data is allocated to the data region.

When indicated in a higher layer, the terminal may support simultaneous transmission of the PUSCH and the PUCCH.

A PUCCH for one terminal is allocated to a resource block pair in the subframe. Resource blocks that belong to the resource block pair occupy different subcarriers in first and second slots, respectively. A frequency occupied by the resource block that belongs to the resource block pair allocated to the PUCCH is changed based on a slot boundary. This means that the RB pair allocated to the PUCCH is frequency-hopped on the slot boundary. The terminal transmits the uplink control information through different subcarriers with time to acquire a frequency diversity gain.

The PUSCH is mapped to the uplink shared channel (UL-SCH) which is a transport channel. Uplink data transmitted on the PUSCH may be a transport block which is a data block for the UL-SCH transmitted during the TTI. The transport block may be user information. Alternatively, the uplink data, may be multiplexed data. The multiplexed data may be acquired by multiplexing the transport block for the UL-SCH and the uplink control information (UCI). For example, the uplink control information multiplexed to data may include a channel quality indicator (CQI), a precoding matrix indicator (PMI), hybrid automatic repeat request acknowledgement/not-acknowledgement (HARQ-ACK/NACK) (may be represented as HARQ-ACK or simply represented by A/N), a rank indicator (RI), and the like. Alternatively, the uplink data May be constituted by only the uplink control information.

Meanwhile, the wireless communication system may support carrier aggregation (CA). Herein, the carrier aggregation means collecting a plurality of carriers having a small bandwidth to configure a wide band. The carrier aggregation system means a system that configures the wide band by collecting one or more subcarriers having a smaller bandwidth than a target wide band when the wireless communication system supports the wide band.

Figure 5:
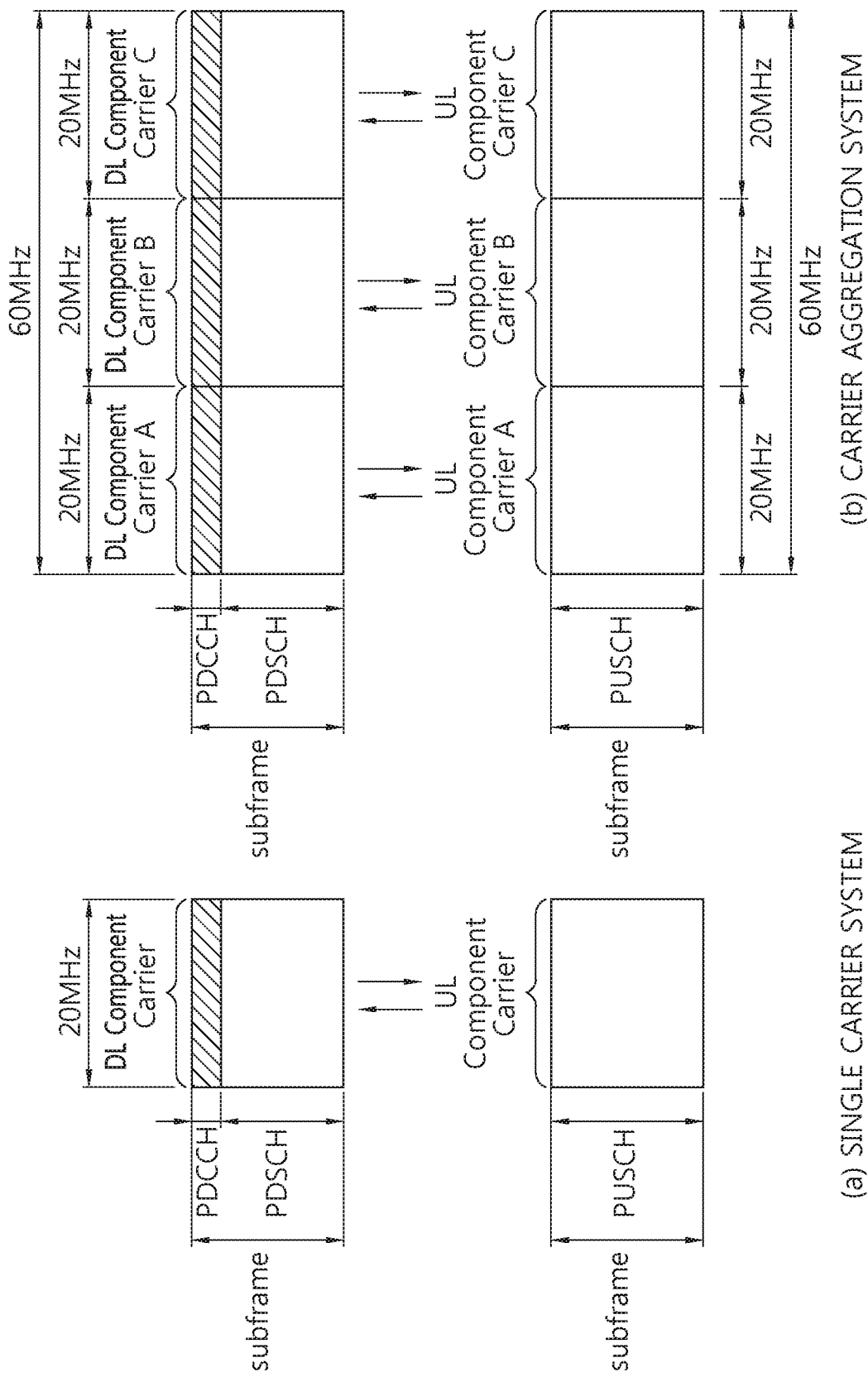
FIG. 5 illustrates a comparative example of a single carrier system and a carrier aggregation system.

FIG. 5 illustrates a comparative example of a single carrier system and a carrier aggregation system.

Referring to FIG. 5, in the single carrier system, only one carrier may be supported to the terminal through the uplink and the downlink. A bandwidth of the carrier may be diversified, but one carrier is allocated to the terminal. On the contrary, in the carrier aggregation system, a plurality of component carriers (CCs) may be allocated to the user equipment. For example, three 20 MHz component carriers may be allocated to allocate a bandwidth of 60 MHz to the terminal. The component carrier includes a downlink component carrier (DL CC) and an uplink (UL) CC.

The carrier aggregation system may be divided into a contiguous carrier aggregation system in which respective carriers are contiguous and a non-contiguous carrier aggregation system in which the respective carriers are separated from each other. When hereinafter, the carrier aggregation system is simply referred to as the carrier aggregation system, it should be understood that the carrier aggregation system includes both the contiguous carrier aggregation system in which the respective component carriers are contiguous and the non-contiguous carrier aggregation system in which the respective component carriers are not contiguous.

Component carriers as targets when one or more component carriers are collected may just use a bandwidth used in the existing system for backward compatibility with the existing system. For example, a 3GPP LTE system supports bandwidths of 1.4 MHz, 3 MHz, 5 MHz, 10 MHz, 15 MHz, and 20 MHz and a 3GPP LTE-A system may configure a wide band of 20 MHz or more by using only the bandwidths of the 3GPP LTE system. Alternatively, the wideband may be configured by defining a new bandwidth without using the bandwidth of the existing system as it is.

A system frequency band of the wireless communication system is divided into a plurality of carrier frequencies. Herein, the carrier frequency means a center frequency of a cell. Hereinafter, the cell may mean a downlink frequency resource and an uplink frequency resource. Alternatively, the cell may mean a combination the downlink frequency resource and an optional uplink frequency resource. Further, in general, when the carrier aggregation (CA) is not considered, the uplink and downlink frequency resources may continuously exist as a pair in one cell.

In order to transmit and receive packet data through a specific cell, the terminal should first complete a configuration for the specific cell. Herein, the configuration means a state in which receiving system information required to transmit and receive data to the corresponding cell is completed. For example, the configuration may include a whole process of receiving common physical layer parameters required to transmit and receive data, MAC layer parameters, or parameters required for a specific operation in an RRC layer. When a cell of which a configuration is completed receives only information to transmit the packet data, the cell is in a state in which a packet can be immediately transmitted and received.

The cell of which the configuration is completed may exist in an activation state or a deactivation state. Herein, the activation represents that data is transmitted or received or the cell is in a ready state. The terminal may monitor or receive the control channel (PDCCH) and the data channel (PDSCH) of the activated cell in order to verify resources (may be the frequency, the time, and the like) allocated thereto.

The deactivation represents that it is impossible to transmit or receive traffic data or measurement or minimum information can be transmitted/received. The terminal may receive system information (SI) required to receive the packet from the deactivated cell. On the contrary, the terminal does not monitor or receive the control channel (PDCCH) and the data channel (PDSCH) of the deactivated cell in order to verify the resources (may be the frequency, the time, and the like) allocated thereto.

The cell may be divided into a primary cell (PCell), a secondary cell (SCell), and a serving cell.

The primary cell means a cell that operates at a primary frequency and means a cell in which the terminal performs an initial connection establishment procedure or a connection reestablishment procedure with the base station or a cell indicated the primary cell during a handover procedure.

The secondary cell means a cell that operates at a secondary frequency and once RRC establishment is settled, the secondary cell is configured and is used to provide an additional radio resource.

The serving cell is configured as the primary cell when the terminal is a terminal in which the CA is not configured or the CA cannot be provided. When the CA is configured, a term called the serving cell is used to represent a set constituted by the primary cell and one or a plurality of cells or all secondary cells.

That is, the primary cell represents one serving cell that provides a security input and NAS mobility information in an RRC establishment or re-establishment state. According to capabilities of the user equipment, at least one cell may be configured to form a set of serving cells together with the primary cell and the at least one cell is referred to as the second cell.

Accordingly, the serving cell configured for one terminal may be constituted by only one primary cell or may be constituted by one primary cell and at least one secondary cell and a plurality of serving cells may be configured for the terminal.

A primary component carrier (PCC) means a CC corresponding to the primary cell. The PCC is a CC in which the terminal is initially connected or RRC-connected with the base station among several CCs. The PCC is a special CC that takes charge of connection or RRC connection for signaling regarding a plurality of CCs and manages UE context information which is establishment information associated with the terminal. Further, the PCC is connected with the terminal and the PCC is in an RRC connected mode, the PCC continuously exists in the activation state.

A second component carrier (SCC) means a CC corresponding to the second cell. That is, the SCC is a CC allocated to the terminal except for the PCC and the SCC is an extended carrier for additional resource allocation, or the like and the SCC may be in the activated state or the deactivated state.

A downlink component carrier corresponding to the primary cell is referred to as a downlink primary component carrier (DL PCC) and an uplink component carrier corresponding to the primary cell is referred to as an uplink primary component carrier (UL PCC). Further, in the downlink, a component carrier corresponding to the secondary cell is referred to as a downlink secondary component carrier (DL SCC) and in the uplink, a component carrier corresponding to the secondary cell is referred to as an uplink secondary component carrier (UL SCC).

The primary cell and the secondary cell have the following features.

First, the primary cell is used for transmission of the PUCCH.

Second, the primary cell is continuously activated, while the secondary cell is a carrier activated/deactivated according to a specific condition.

Third, when the primary cell undergoes a radio link failure (hereinafter, referred to as RLF), the RRC re-establishment is triggered, but when the secondary cell undergoes the RLF, the RRC re-establishment is not triggered.

Fourth, the primary cell may be changed by changing a security key or a handover procedure accompanied with a random access channel (RACH).

Fifth, non-access stratum (NAS) information is received through the primary cell.

Sixth, in the primary cell, the DL PCC and the UL PCC are continuously constituted as a pair.

Seventh, different component carriers CCs may be configured as the primary cell in respective terminals.

Eighth, procedures of reconfiguration, adding, and removal of the primary cell may be performed by the RRC layer. In adding a new secondary cell, RRC signaling may be used to transmit system information of a dedicated secondary cell.

The downlink component carrier may constitute one serving cell, and the downlink component carrier and the uplink Component carrier are established to constitute one serving cell. However, the serving cell is not constituted by only one uplink component carrier.

Activation/deactivation of the component carrier is equivalent to, that is, a concept of activation/deactivation of the serving cell. For example, assumed that serving cell 1 is constituted by DL CCI, activation of serving cell 1 means activation of DL CCI. Assumed that serving cell 2 is constituted by establishing DL CC2 and UL CC2, activation of serving cell 2 means activation of DL CC2 and UL CC2. In the Meantime, each component carrier may correspond to the cell.

The numbers of component carriers aggregated between the downlink and the uplink may be set to be different from each other. A case in which the number of the downlink component carriers and the number of uplink component carriers are the same as each other is referred to as symmetric aggregation and a case in which the numbers are different from each other is referred to as asymmetric aggregation. Further, the sizes (that is, bandwidths) of the component carriers may be different from each other. For example, when it is assumed that five component carriers are used to configure a 70 MHz-band, the 70 MHz-band may be constituted by 5 MHz component carrier (earlier #0), 20 MHz component carrier (carrier #1), 20 MHz component carrier (carrier #2), 20 MHz component carrier (carrier #3), and 5 MHz component carrier (carrier #4).

As described above, the carrier aggregation system may support a plurality of component carriers (CCs) unlike the single carrier system. That is, one terminal may receive a plurality of PDSCHs through a plurality of DL CCs. Further, the terminal may transmit an ACK/NACK for the plurality of PDSCH through one UL CC, for example, UL PCC. That is, in the single carrier system in the related art, since only one PDSCH is received in one subframe, maximum two pieces of HARQ. ACK/NACK (hereinafter, abbreviated as ACK/NACK for easy description) were just transmitted. However, in the carrier aggregation system, since the ACK/NACK for the plurality of PDSCHs may be transmitted through one UL CC, an ACK/NACK transmitting method therefor is required.

The terminal may monitor the PDCCH in the plurality of DL CCs and receive a downlink transport block simultaneously through the plurality of DL CCs. The user equipment may transmit a plurality of uplink transport blocks simultaneously through a plurality of UL CCs.

In the multiple carrier system, two methods for CC scheduling can be provided.

The first method is that a PDCCH-PDSCH pair is, transmitted in one CC. The CC is referred to as self-scheduling. Further, this means that the UL CC through which the PUSCH is transmitted means becomes a CC linked to the DL CC through which the corresponding PDSCCH is transmitted. That is, in the PDCCH, the PDSCH resource is allocated on the same CC or the PUSCH resource is allocated on the linked UL CC.

The second method is that the DL CC through which the PDSCH is transmitted or the UL CC through which the PUSCH is transmitted is determined regardless of the DL CC through which the PDCCH is transmitted. That is, the PDCCH and the PDSCH are transmitted in different DL CCs or the PUSCH is transmitted through the UL CC not linked with the DL CC through which the PDCCH is transmitted. This is referred to as cross-carrier scheduling. The CC through which the PDCCH is transmitted is referred to as a PDCCH carrier, a monitoring carrier, or a scheduling carrier or the CC through which the PDSCH/PUSCH is transmitted is referred to as a PDSCH/PUSCH carrier or a scheduled carrier.

Hereinafter, the existing PUCCH formats will be described.

The PUCCH transports various types of control information according to a format. PUCCH format 1 transports a scheduling request (SR). In this case, an on-off keying (OOK) scheme may be applied. PUCCH format 1a transports an acknowledgement/non-acknowledgment (ACK/NACK) modulated by a binary phase shift keying (BPSK) scheme one codeword. PUCCH format 1b transports an ACK/NACK modulated by a quadrature phase shift keying (QPSK) scheme for two codewords. PUCCH format 2 transports a channel quality indicator (CQI) modulated by the QPSK scheme. PUCCH formats 2a and 2b transport the CQI and the ACK/NACK.

The PUCCH format may be divided according to the modulation scheme and the number of bits in the subframe. Table 1 illustrates a modulation scheme according to the PUCCH format and the number of bits in the subframe.

TABLE 1

| PUCCH format | Modulation scheme | Number of bits per subframe, $M_{bit}$ |
|---|---|---|
| 1 | N/A | N/A |
| 1a | BPSK | 1 |

TABLE 1-continued

| PUCCH format | Modulation scheme | Number of bits per subframe, $M_{bit}$ |
|---|---|---|
| 1b | QPSK | 2 |
| 2 | QPSK | 20 |
| 2a | QPSK + BPSK | 21 |
| 2b | QPSK + QPSK | 22 |
| 3 | QPSK | 48 |

Figure 6:
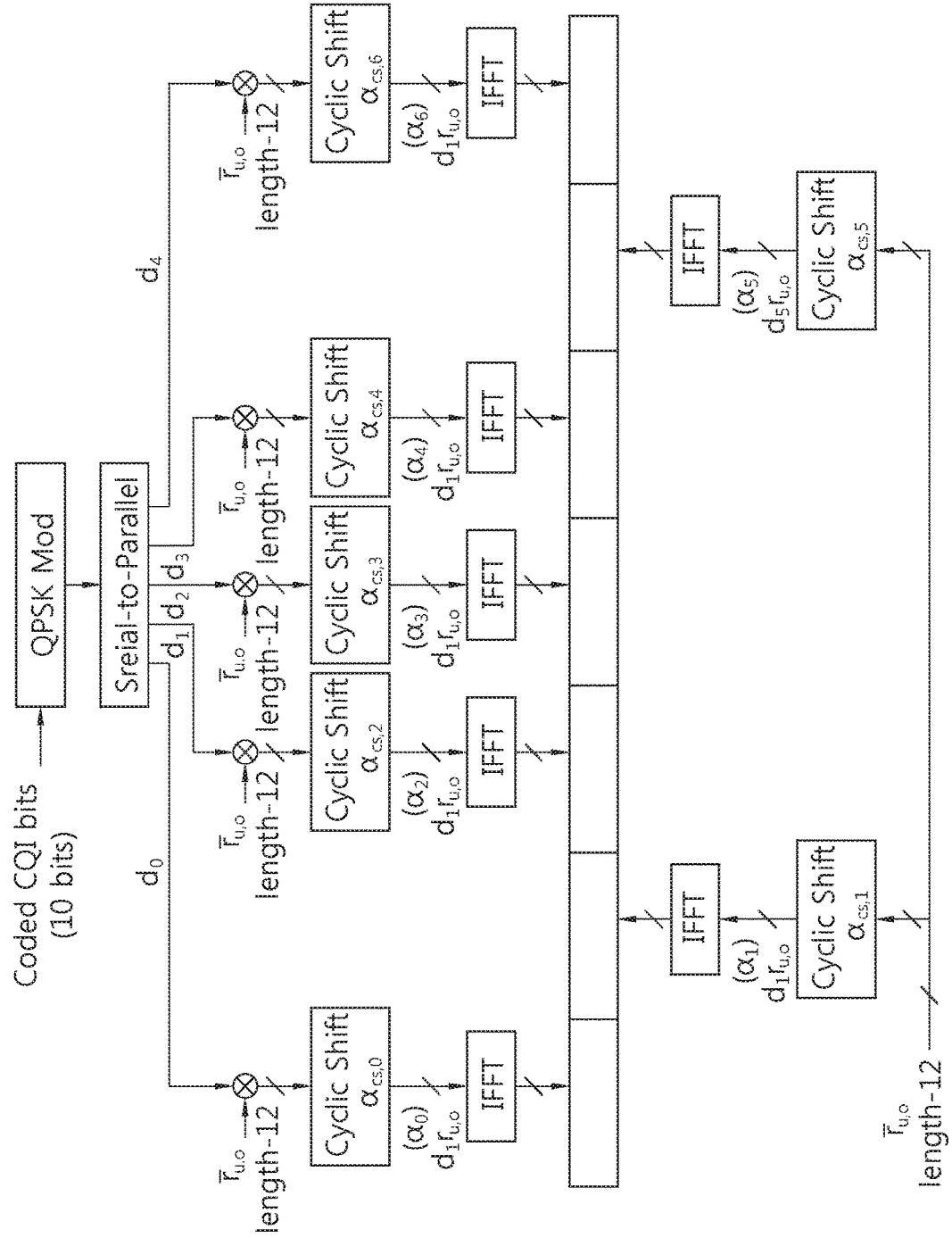
FIG. 6 illustrates a channel structure of a PUCCH format 2/2a/2b for one slot in a normal CP.

FIG. 6 illustrates a channel structure of a PUCCH format 2/2a/2b for one slot in a normal CP. As described above, the PUCCH format 2/2a/2b is used to transmit the CQI.

Referring to FIG. 6, SC-FDMA symbols 1 and 5 are used for a demodulation reference symbol (DM RS) which is an uplink reference signal in the normal CP. In the extended CP, SC-FDMA symbol 3 is used for the DM RS.

10 CQI information bits are channel-coded at for example, ½ rate to become 20 coded bits. A Reed-Muller (RM) code may be used in the channel coding. In addition, the information bits are scrambled (similarly as PUSCH data being scrambled with a gold sequence having a length of 31) and thereafter, QPSK constellation mapped, and as a result, a QPSK modulation symbol is generated ($d_0$ to $d_4$ in slot 0). Each QPSK modulation symbol is modulated by a cyclic shift of a basic RS sequence having a length of 12 and OFDM-modulated and thereafter, transmitted in each of 10 SC-FDMA symbols in the subframe. 12 uniformly separated periodic shifts allow 12 different user equipment to be orthogonally multiplexed in the same PUCCH resource block. As a DM RS sequence applied to the SC-FDMA symbols 1 and 5, the basic RS sequence having the length of 12 may be used.

Figure 7:
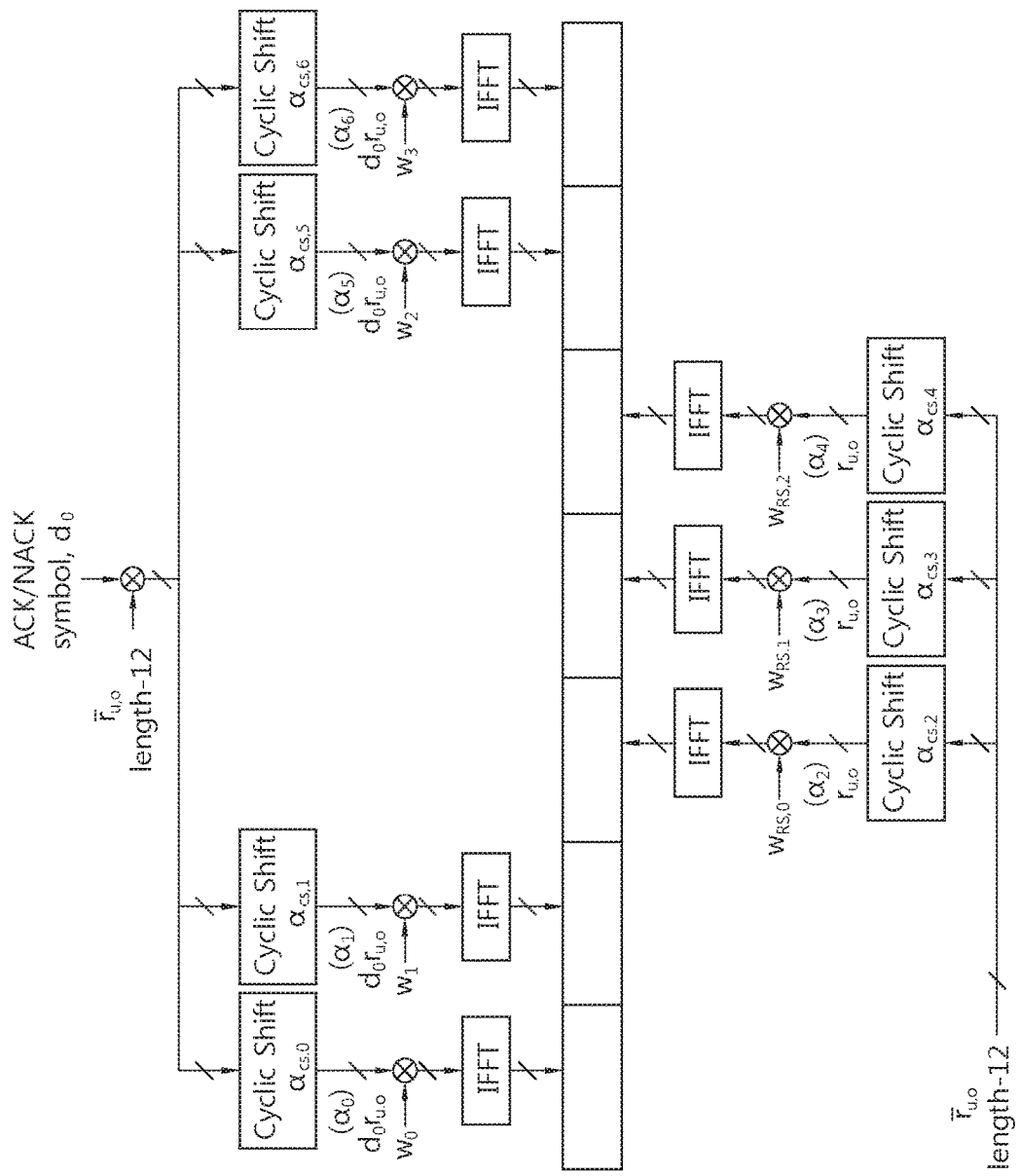
FIG. 7 illustrates a PUCCH format 1a/1b for one slot in the normal CP.

FIG. 7 illustrates a PUCCH format 1a/1b for one slot in the normal CP. The uplink reference signal is transmitted in $3^{rd}$ to $5^{th}$ SC-FDMA symbols. In FIG. 7, $w_0$, $w_1$, $w_2$, and $w_3$ may be modulated in the time domain after inverse fast Fourier transform (IFFT) modulation or in the frequency domain before the IFFT modulation.

In the LTE, the ACK/NACK and the CQI may be simultaneously in the same subframe and may not be permitted to be simultaneously transmitted. In this case, the ACK/NACK is an ACK/NACK for a single cell. When the ACK/NACK and the CQI are not permitted to be simultaneously transmitted, the user equipment may need to transmit the ACK/NACK in a PUCCH of a subframe in which CQI feedback is configured. In this case, the CQI is dropped and only the ACK/NACK is transmitted through the PUCCH format 1a/1b.

The simultaneous transmission of the ACK/NACK and the CQI in the same subframe may be configured through user equipment-specific higher layer (RRC) signaling. For example, whether the ACK/NACK and the CQI may be simultaneously transmitted in the same subframe may be configured by a parameter 'simultaneousAckNackAndCQI' included in the radio resource control (RRC) message. That is, when 'simultaneousAckNackAndCQI' is set 'TRUE', the simultaneous transmission may be permitted when 'simultaneousAckNackAndCQI' is set as 'FALSE', the simultaneous transmission may not be permitted. When the simultaneous transmission is available, the CQI and 1-bit or 2-bit ACK/NACK information may be multiplexed to the same PUCCH resource block in a subframe in which a base station scheduler permits the simultaneous transmission of the CQI and the ACK/NACK. In this case, it is necessary to maintain a single carrier characteristic having low cubic metric (CM). The normal CP and the extended CP are different from each other in a method for multiplexing the CQI and the ACK/NACK while maintaining the single carrier characteristic.

First, when the 1-bit or 2-bit ACK/NACK and the CQI are together transmitted through the PUCCH format 2a/2b in the normal CP, ACK/NACK bits are not scrambled, but BPSK (in the case of 1 bit)/QPSK (in the case of 2 bits)-modulated to become one ACK/NACK demodulated symbol ($d_{HARQ}$). The ACK is encoded by a binary '1' and the NACK is encoded by a binary '0'. One ACK/NACK demodulated symbol ($d_{HARQ}$) is used to modulate a second RS symbol in each slot. That is, the ACK/NACK is signaled by using the RS.

Figure 8:
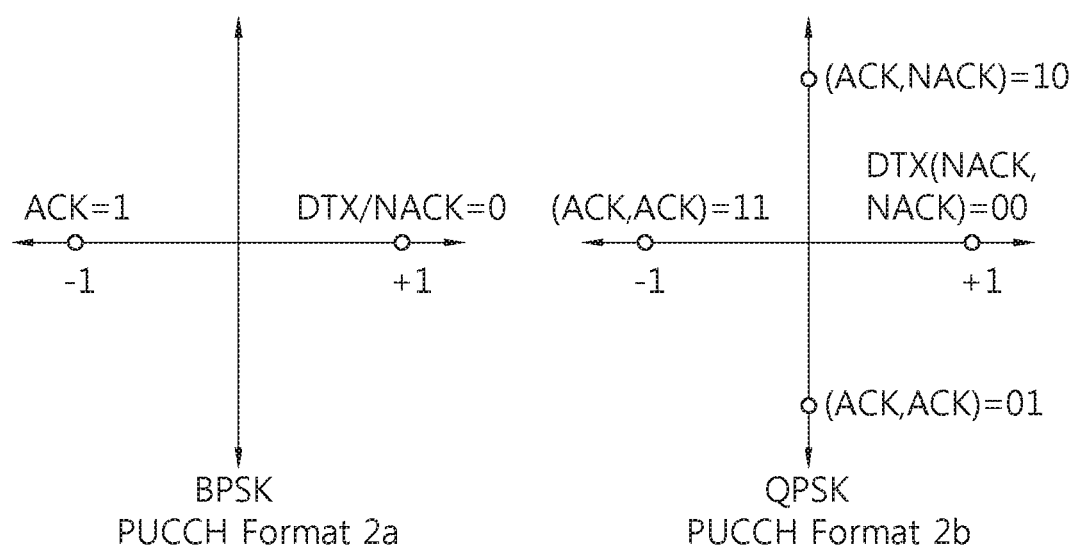
FIG. 8 illustrates an example of constellation mapping of ACK/NACK in the PUCCH format 2a/2ba in the normal CP.

FIG. 8 illustrates an example of constellation mapping of ACK/NACK in the PUCCH format 2a/2ba in the normal CP.

Referring to FIG. 8, the NACK (NACK and NACK in the case of transmitting two downlink codewords) is mapped to +1. In discontinuous transmission (DTX) meaning a case in which the user equipment fails to detect a downlink grant in the PDCCH, neither the ACK nor the NACK is transmitted and in this case, a default NACK is configured. The DTX is analyzed as the NACK and causes downlink retransmission.

Next, in the extended CP in which one RS symbol per slot is used, the 1 or 2-bit ACK/HACK is joint-coded with the CQI.

Figure 9:
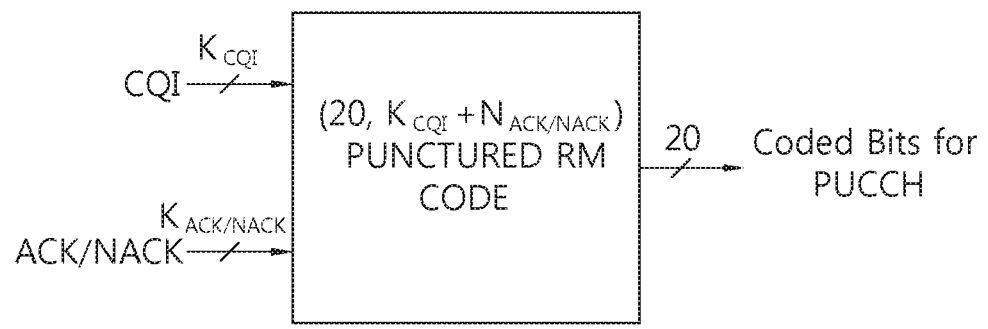
FIG. 9 illustrates an example of joint coding of ACK/NACK and a CQI in an extended CP.

FIG. 9 illustrates an example of joint coding of ACK/NACK and a CQI in an extended CP.

Referring to FIG. 9, the maximum bit number of information bits supported by an RM code may be 13. In this case, CQI information bits $K_{cqi}$ may be 11 bits and ACK/NACK information bits $K_{ACK/NACK}$ may be 2 bits. The CQI information bits and the ACK/NACK information bits are concatenated to generate a bit stream and thereafter, channel-coded by the RM code. In this case, it is expressed that the CQI information bits and the ACK/NACK information bits are joint-coded. That is, the CQI information bits and the ACK/NACK information bits are joint-coded to become 20 coded bits. A 20-bit codeword generated through such a process is transmitted in the PUCCH format 2 having the channel structure (different from FIG. 6 in that one RS symbol is used per slot in the case of the extended CP) described in FIG. 6.

In the LTE, the ACK/NACK and the SR are multiplexed to be simultaneously transmitted through the PUCCH format 1a/1b.

Figure 10:
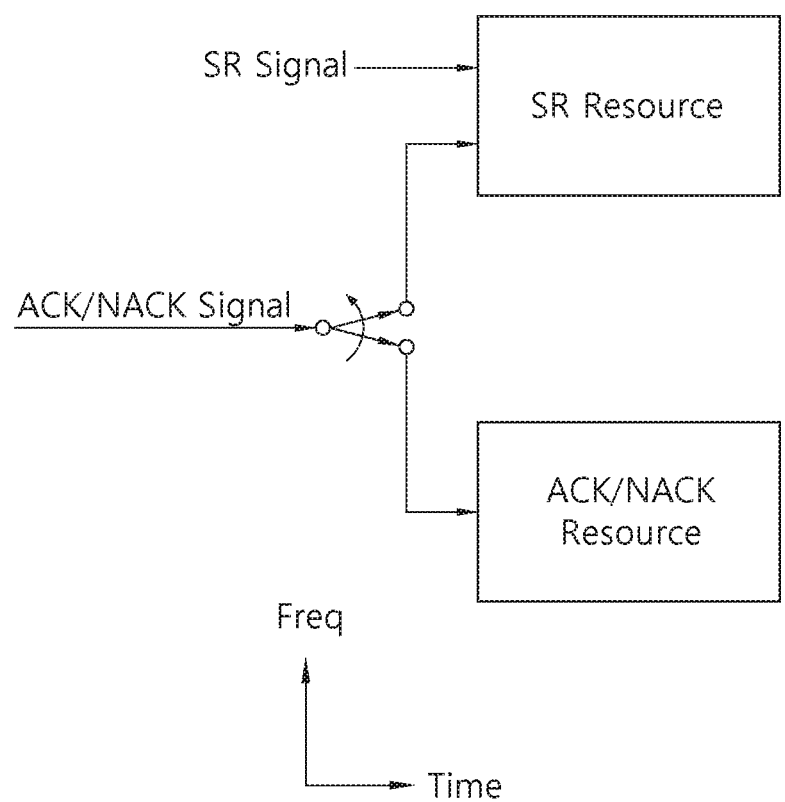
FIG. 10 illustrates a method in which ACK/NACK and an SR are multiplexed.

FIG. 10 illustrates a method in which ACK/NACK and an SR are multiplexed.

Referring to FIG. 10, when the ACK/NACK and the SR are simultaneously transmitted in the same subframe, the user equipment transmits the ACK/NACK in an allocated SR resource and in this case, the ACK/NACK means a positive SR. When receiving the positive SR, the base station may know that the user equipment requests scheduling. Further, the user equipment may transmit the ACK/NACK in an allocated ACK/NACK resource and the ACK/NACK means a negative SR. That is, the base station may identify whether the SR is the positive SR or the negative SR as well as the ACK/NACK through which resource the ACK/NACK being transmitted in the subframe in which the ACK/NACK and the SR are simultaneously transmitted.

Figure 11:
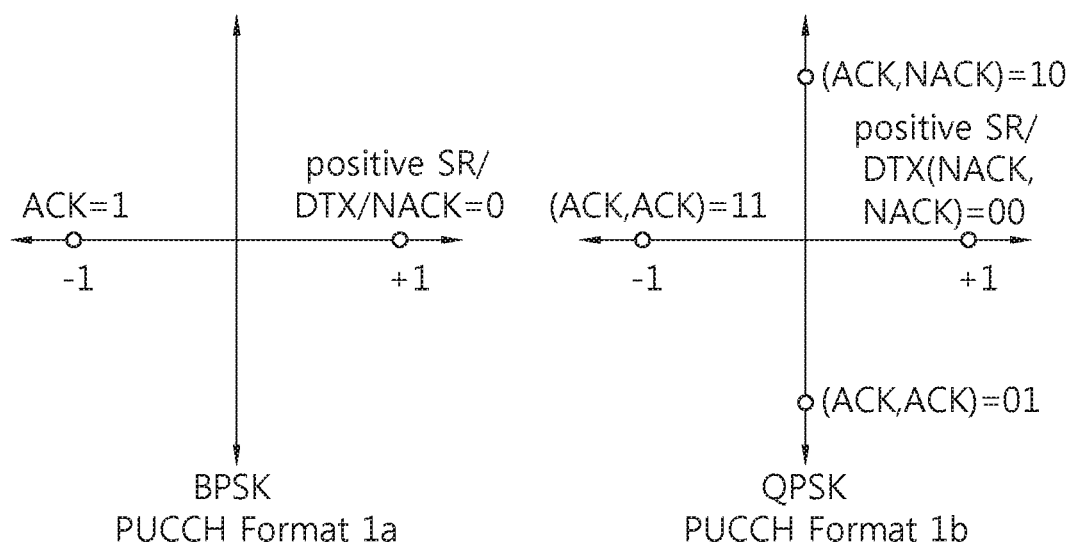
FIG. 11 illustrates constellation mapping when the ACK/NACK and the SR are simultaneously transmitted.

FIG. 11 illustrates constellation mapping when the ACK/NACK and the SR are simultaneously transmitted.

Referring to FIG. 11, the DTX/NACK and the positive SR are mapped to +1 of a constellation map and the ACK is mapped to −1. The constellation map may show a, phase of a signal.

Meanwhile, in the LTE TDD system, the user equipment may feed back to the base station a plurality of ACKs/NACKs for a plurality of PDSCHs. The reason is that the user equipment may receive the plurality of PDSCHs in a plurality of subframes and transmit the ACKs/NACKs for the plurality of PDSCH in one subframe. In this case, two types of ACK/NACK transmitting methods are provided.

The first method is ACK/NACK bundling. In the ACK/NACK bundling, ACK/NACK bits for a plurality of data units are coupled through a logical AND operation. For example, when the user equipment successfully decodes all of the plurality of data units, the user equipment transmits only one ACK bit. On the contrary, when the user equipment fails to decode or detect even any one of the plurality of data units, the user equipment transmits the NACK bit or transmit no NACK bit.

Bundling includes spatial bundling, bundling in the time domain, and bundling in the frequency domain, and the like. The spatial bundling is a technique that compresses an A/N for each codeword at the time of receiving a plurality of codewords in one PDSCH. The bundling in the time domain is a technique that compresses As/Ns for data units received in different subframes. The bundling in the frequency domain is a technique that compresses As/Ns for data units received in different cells (that is, CCs).

The second method is ACK/NACK multiplexing. In the ACK/NACK multiplexing method, contents or meanings of the ACKs/NACKs for the plurality of data units may be identified by combinations of PUCCH resources and QPSK modulated symbols used for actual ACK/NACK transmission. This is also called channel selection. The channel selection may be called PUCCH 1a/1b channel selection according to the used PUCCH.

For example, it is assumed that maximum two data unit may be transmitted and one PUCCH resource may transport 2 bits. In this case, it is assumed that an HARQ operation for each data unit may be managed by one ACK/NACK bit. In this case, the ACK/NACK may be identified in a transmission node (for example, the base station) that transmits the data unit as shown in a table given below.

TABLE 2

| HARQ-ACK(0), HARQ-ACK(1) | $n^{(1)}_{PUCCH}$ | b(0),b(1) |
|---|---|---|
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NAC.K/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

In Table 2, HARQ-ACK(i) indicates an ACK/NACK result data unit i. In the example, two data units of data unit 0 and data unit 1 may be provided. In Table 2, the DTX means that the data unit for the corresponding HARQ-ACK (i) is not transmitted. Alternatively, the DTX means that the receiver (for example, the user equipment) is not capable of detecting the data unit for the HARQ-ACK(i). $n^{(1)}_{PUCCH,X}$ indicates the PUCCH resource used for the actual transmission of the ACK/NACK and maximum two PUCCH resources are provided. That is, two PUCCH resources are $n^{(1)}_{PUCCH,0}$ and $n^{(1)}_{PUCCH,1}$. b(0) and b(1) represent 2 bits transferred by a selected PUCCH resource. A modulated symbol transmitted through the PUCCH resource is determined according to b(0) and b(1).

For example, if the receiver successfully receives and decodes two data units, the receiver needs to transmit two bits (b(0), b(1)) as (1,1) by using the PUCCH resource $n^{(1)}_{PUCCH,1}$. As another example, it is assumed that the receiver receives two data units to fail to decode a first data unit and succeed in decoding a second data unit. In this case, the receiver needs to transmit (0, 0) by using $n^{(1)}_{PUCCH,1}$.

As described above, the ACKs/NACKs for the plurality of data units may be transmitted by using a single PUCCH resource by a method for linking the content (or meaning) of the ACK/NACK with a combination of a PUCCH resource and a content of an actual bit transmitted in the corresponding PUCCH resource.

In the ACK/NACK multiplexing method, if at least one ACK exists for all data units, the NACK and the DTX is displayed as a couple such as the NACK/DTX. The reason is that it is short to cover all ACK/NACK combinations by distinguishing the NACK and the DTX by only a combination of the PUCCH resource and the QPSK symbol.

In the ACK/NACK bundling or ACK/NACK multiplexing method, the total number of PDSCHs as targets transmitted by the user equipment is important. When the user equipment is not capable of receiving some PDCCHs among a plurality of PDCCHs to schedule a plurality of PDSCHs, an error occurs in the total number of the PDSCHs as the targets of the ACK/NACK, and as a result, a wrong ACK/NACK may be transmitted. In order to solve the error, a downlink assignment index (DAI) is transmitted with being included in the PDCCH in the TDD system. The DAI indicates a counting value by counting the number of the PDCCHs to schedule the PDCCH.

Hereinafter, an uplink channel coding method for the PUCCH format 2 will be described.

Table 3 given below shows one example of a (20, A) RM code used for channel coding of the PUCCH format 2. Herein, A may represent the bit number (that is, $K_{cqi}$+ $K_{ACK/NACK}$) of the bit stream in which the CQI information bits and the ACK/NACK information bits are concatenated. When the bit stream is, the bit stream may be used as an input of a channel coding block using the (20, A) RM code.

TABLE 3

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

A bit stream channel-coded by the RM code, $b_0, b_1, b_2, \ldots, b_{B-1}$ may be generated as shown in Equation 1 given below.

$$b_i = \sum_{n=0}^{A-1} (a_n \cdot M_{i,n}) \bmod 2 \quad \text{[Equation 1]}$$

In Equation given above, i=0, 1, 2, ..., B−1 and B=20.

Channel-coded bits are mapped to the code-time-frequency resource.

Figure 12:
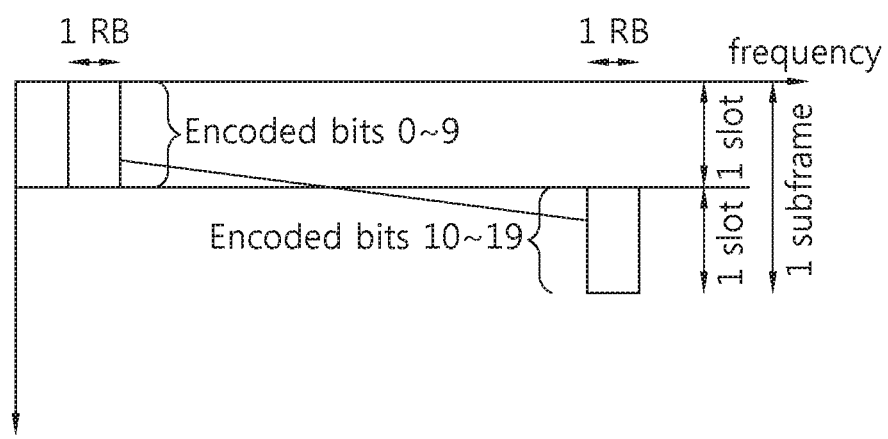
FIG. 12 illustrates an example in which channel-coded bits are mapped to a code-time-frequency resource.

FIG. 12 illustrates an example in which channel-coded bits are mapped to a code-time-frequency resource.

Referring to FIG. 12, first 10 bits and last 10 bits among 20 bits which are channel-coded are mapped to different code-time-frequency resources and in particular, first 10 bits and last 10 bits are largely separated and transmitted in in the frequency domain for frequency diversity.

Hereinafter, one example of an uplink channel coding method in LTE-A will be described.

As described above, in the LTE, when the UCI is transmitted in the PUCCH format 2, a CSI of maximum 13 bits is RM-coded through the (20, A) RM code of Table 3. On the contrary, when the UCI is transmitted through the PUSCH, a CQI of maximum 11 bits is RM-coded through a (32, A) RM code of Table 4 given below and truncated or circularly repeated in order to match code rate to be transmitted in the PUSCH.

TABLE 4

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Meanwhile, in the LTE-A, PUCCH format 3 is introduced in order to transmit a UCI (the ACK/NACK and the SR) of maximum 21 bits (represent the bit number before channel coding as information bits and maximum 22 bits when the SR is included). PUCCH format 3 uses QPSK as the modulation scheme and the number of bits transmittable in the subframe is 48 bits (this is the number of bits transmitted after the information bit is channel-coded.

The PUCCH format 3 performs block spreading based transmission. That is, a modulated symbol sequence that modulates a multi-bit ACK/NACK by using a block spreading code is spread and thereafter, transmitted in the time domain.

Figure 13:
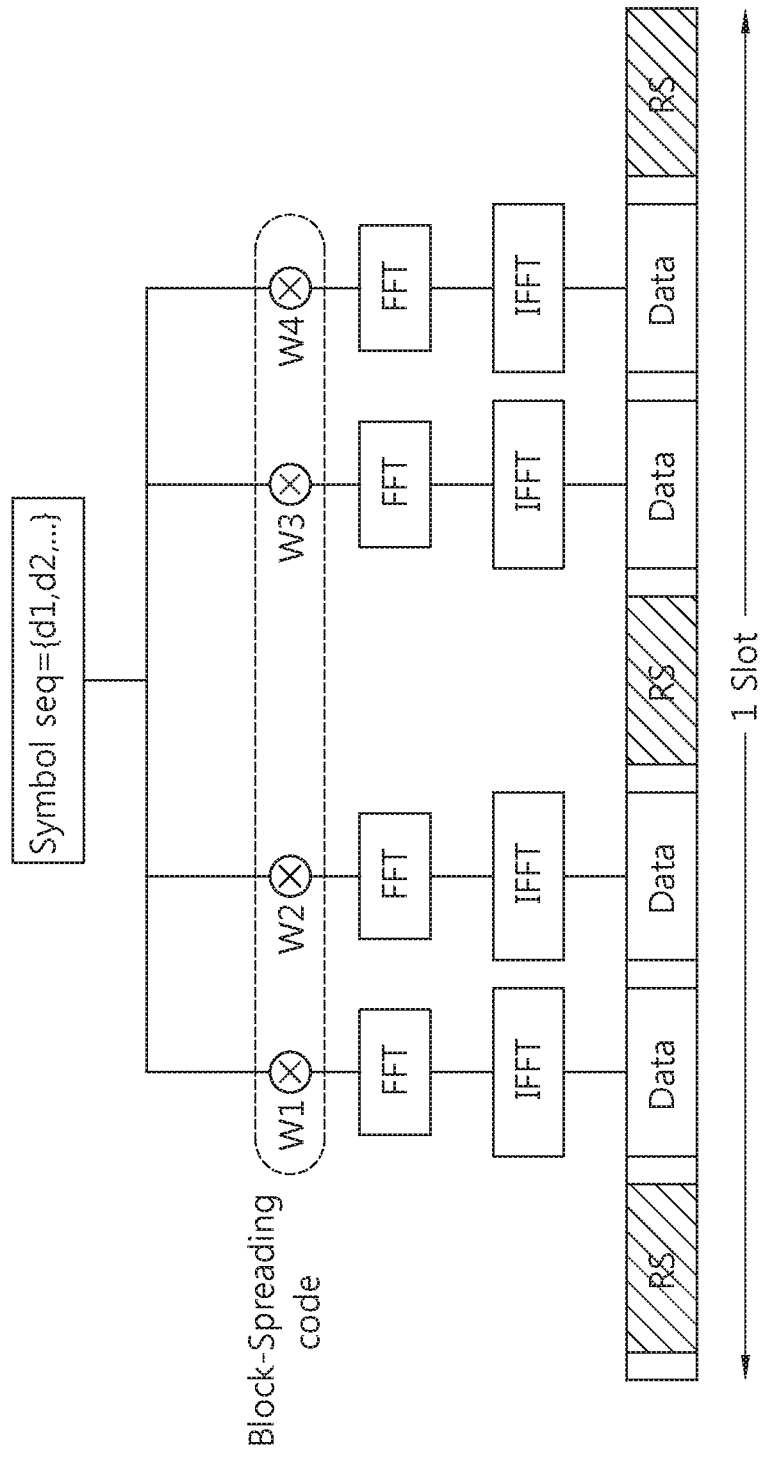
FIG. 13 exemplifies a channel structure of PUCCH format 3.

FIG. 13 exemplifies a channel structure of PUCCH format 3.

Referring to FIG. 13, the block spreading code is applied to a modulated symbol sequence {d1, d2, . . . } to be spread in the time domain. The block spreading code may be an orthogonal cover code (OCC). Herein, the modulated symbol sequence may be a sequence of the modulated symbols in which the ACK/NACK information bits which are multiple bits are channel-coded (using the RM code, a TBCC, a punctured RM code, and the like) to generate ACK/NACK coded bits and the ACK/NACK coded bits are modulated (for example, QPSK-modulated). The sequence of the modulated symbols is mapped to data symbols of the slot through fast Fourier transform (FFT) and inverse fast Fourier transform (IFFT) and thereafter, transmitted. FIG. 13 exemplifies a case in which two RS symbols exist in one slot, but three RS symbols may exist and in this case, a block spreading code having a length of 4 may be used.

In the PUCCH format 3, 48 channel-coded bits may be transmitted in the normal CP. When UCI bits (information bits) are 11 bits or less, the (32, A) RM code of Table 4 is used and circular repetition is used to match the coded bit number of the PUCCH format 3. As shown in Table 4, since the (32, A) RM code just has 11 basis sequences, when the UCI bits are more than 11 bits, dual RM coding using two (32, A) RM codes is performed.

Figure 14:
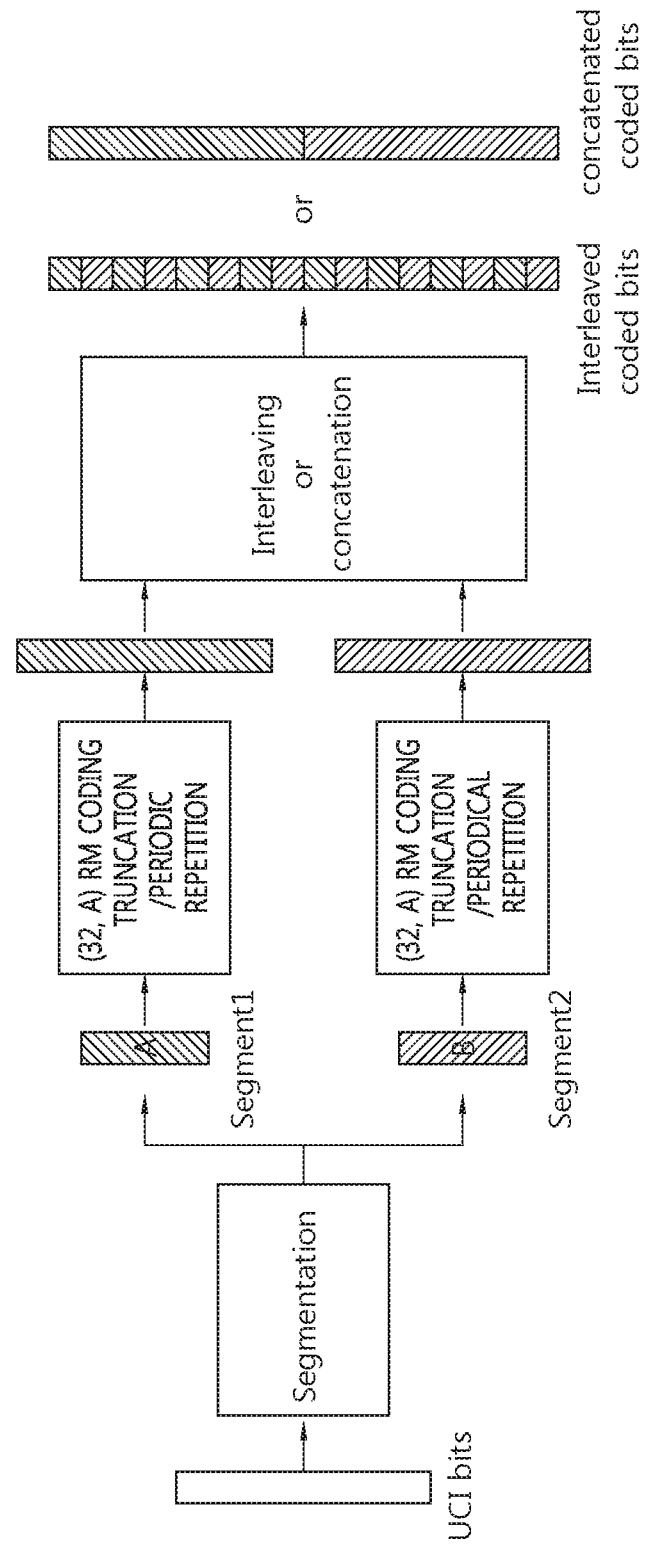
FIG. 14 exemplifies a dual RM coding process.

FIG. 14 exemplifies a dual RM coding process.

Referring to FIG. 14, when a UCI bit stream (information bits) is more than 11 bits, a bit stream (referred to as a segment) segmented through segmentation is generated. In this case, each of segment 1 and segment 2 becomes 11 bits or less. The segments 1 and 2 are interleaved or concatenated through the (32, A) RM code. Thereafter, the UCI bit stream is truncated or circularly repeated in order to match the coded bit number of the PUCCH format 3.

[Method for Transmitting Channel Status Information in Wireless Communication System]

A modulation and coding scheme (MCS) and transmission power are controlled according to a given channel by using link adaptation in order to maximally use a channel capacity given in the wireless communication system. In order to the base station to perform the link adaptation, feedback of channel status information of the user equipment is required.

1. Channel Status Information (CSI)

Feedback of channel information is required for efficient communication, and in general, downlink channel information is transmitted through the uplink and uplink channel information is transmitted through the downlink. Channel information representing a status of a channel is referred to as the channel status information and the channel status information includes a precoding matrix index (PMI), a rank indicator (RI), a channel quality indicator (CQI), and the like.

2. Downlink Transmission Mode.

The downlink transmission mode may be divided into 9 modes to be described below.

Transmission mode 1: Single antenna pod, port 0

Transmission mode 2: Transmit diversity

Transmission mode 3: Open loop spatial multiplexing The transmission mode 3 is an open loop mode in which rank adaptation is available based on RI feedback. When a rank is 1, the transmit diversity may be applied. When the rank is larger than 1, a large delay CDD may be used.

Transmission mode 4: Closed loop spatial multiplexing or transmit diversity

Transmission mode 5: Transmit diversity or multi-user MIMO

Transmission mode 6: Transmit diversity or closed loop spatial multiplexing having a single transmission layer Transmission mode 7: If the number of physical broadcast channel (PBCH) antenna ports is 1, a single antenna port (port 0) is used and if not, the transmit diversity is used. Alternatively, single antenna transmission (port 5)

Transmission mode 8: If the number of PBCH antenna ports is 1, the single antenna port (port 0) is used and if not, the transmit diversity is used. Alternatively, dual layer transmission using antenna ports 7 and 8 or single antenna port transmission using port 7 or 8.

Transmission mode 9: Transmission of maximum 8 layers (ports 7 to 14).

In the case of not a multicast-broadcast single frequency network (MBSFN) subframe, if the number of PBCH antenna ports is 1, the single antenna port (port 0) is used and if not, the transmit diversity is used.

In the case of the MBSFN subframe, single antenna port transmission (port 7).

3. Periodic Transmission of CSI.

The CSI may be transmitted through the PUCCH periodically according to a cycle determined in the higher layer. The user equipment may be semistatically by a higher layer signal so as to periodically feed back a differential CSI (CQI, PMI, RI) through the PUCCH. In this case, the user equipment transmits the corresponding CSI according to modes defined as shown in a table given below.

TABLE 5

|  |  | PMI Feedback Type | |
| --- | --- | --- | --- |
|  |  | No PMI | Single PMI |
| PUCCH CQI Feedback Type | Wideband (wideband COI) | Mode 1-0 | Mode 1-1 |
|  | UE Selected (subband COI) | Mode 2-0 | Mode 2-1 |

A periodic CSI reporting mode in the PUCCH described below is supported for each of the aforementioned transmission modes.

TABLE 6

| Transmission mode | PUCCH CSI reporting modes |
| --- | --- |
| Transmission mode 1 | Modes 1-0, 2-0 |
| Transmission mode 2 | Modes 1-0, 2-0 |
| Transmission mode 3 | Modes 1-0, 2-0 |
| Transmission mode 4 | Modes 1-1, 2-1 |
| Transmission mode 5 | Modes 1-1, 2-1 |
| Transmission mode 6 | Modes 1-1, 2-1 |
| Transmission mode 7 | Modes 1-0, 2-0 |

TABLE 6-continued

| Transmission mode | PUCCH CSI reporting modes |
| --- | --- |
| Transmission mode 8 | When PMI/RI reporting is set for modes 1-1 and 2-1 user equipments; When PMI/RI reporting is not set for modes 1-0 and 2-0 user equipments |
| Transmission mode 9 | When PMI/RI reporting is set for the modes 1-1 and 2-1 user equipments and the number of CSI-RS ports is larger than 1. When PMI/RI reporting is not set for the modes 1-0 and 2-0 user equipments or the number of CSI-RS ports is 1 |

Meanwhile, a collision of the CSI report represents a case in which a subframe configured to transmit a first CSI and a subframe configured to transmit a second CSI are the same as each other. When the collision of the CSI report occurs, the first CSI and the second CSI are simultaneously transmitted or transmission of a CSI having a low priority is abandoned (this will be referred to as drop) and a CSI having a high priority may be transmitted according to priorities of the first CSI and the second CSI.

The CSI report through the PUCCH may include various report types according to a transmission combination of the CQI, the PMI, and the RI and a cycle and an offset value divided according to each report type (hereinafter, abbreviated as a type) are supported.

Type 1: Supports CQI feedback for a subband selected by the user equipment.

Type 1a: Supports subband CQI and second PMI feedback.

Types 2, 2b, and 2c: Supports wideband CQI and PMI feedback.

Type 2a: Supports the wideband PMI feedback.

Type 3: Supports RI feedback.

Type 4: Transmits the wideband CQI.

Type 5: Supports RI and wideband PMI feedback.

Type 6: Supports RI and PTI feedback.

For each serving cell, $N_{pd}$ which is a subframe-unit cycle and an offset $N_{offset,CQI}$ are determined based on a parameter 'cqi-pmi-ConfigIndex' ($I_{CQI/PMI}$) for CQI/PMI reporting. Further, for each serving cell, period $M_{RI}$ and a relative offset $N_{offset,RI}$ are determined based on a parameter 'ri-ConfigIndex' ($I_{RI}$) for RI reporting. 'cqi-pmi-ConfigIndex' and 'ri-ConfigIndex' are set by the higher layer signal such as the RRC message. The relative offset $N_{offset,RI}$ for the RI has a value in a set $\{0, -1, \ldots, -(N_{pd}-1)\}$.

A subframe in which the user equipment reports the CSI is referred to as a CSI subframe and a CSI subframe set constituted by a plurality of CSI subframes may be configured for the user equipment. If reporting is configured in two or more CSI subframe sets for the user equipment, 'cqi-pmi-ConfigIndex' and 'ri-ConfigIndex' corresponding to the respective CSI subframe sets are given. For example, when CSI reporting is configured in two CSI subframe sets, 'cqi-pmi-ConfigIndex' and 'ri-ConfigIndex' are for a first CSI subframe set and 'cqi-pmi-ConfigIndex2' and 'ri-ConfigIndex2' are for a second CSI subframe set.

When a CSI report which CSI type 3, 5, or 6 for one serving cell and a CSI report which is CSI type 1, 1a, 2, 2a, 2b, 2c, or 4 for one serving cell collide with each other, the CSI report which is the CSI type 1, 1a, 2, 2a, 2b, 2c, or 4 has a low priority and is dropped.

When two or more serving cells are configured for the user equipment, the user equipment performs only CSI reporting for only one serving cell in a given subframe. The CSI report which is the CSI type 3, 5, 6, or 2a of a first cell and the CSI report which is the CSI type 1, 1a, 2, 2a, 2b, 2c, or 4 of a second cell may collide with each other in the given subframe. In this case, the CSI report which is the CSI type 1, 1a, 2, 2a, 2b, 2c, or 4 has the low priority and is dropped.

A CSI report which is CSI type 2, 2b, 2c, or 4 of the first cell and a CSI report which is CSI type 1 or 1a of the second cell may collide with each other in the given subframe. In this case, the CSI report which is the CSI type 1 or 1a has the low priority and is dropped. The first cell and the second cell are different cells.

CSI type CSI reports having the same priority in different serving cells may collide with each other in the given subframe. In this case, a CSI of a serving cell having the lowest serving cell index (ServCellIndex) is reported and CSIs of all other serving cells are dropped.

Hereinafter, the present invention will be described.

Figure 15:
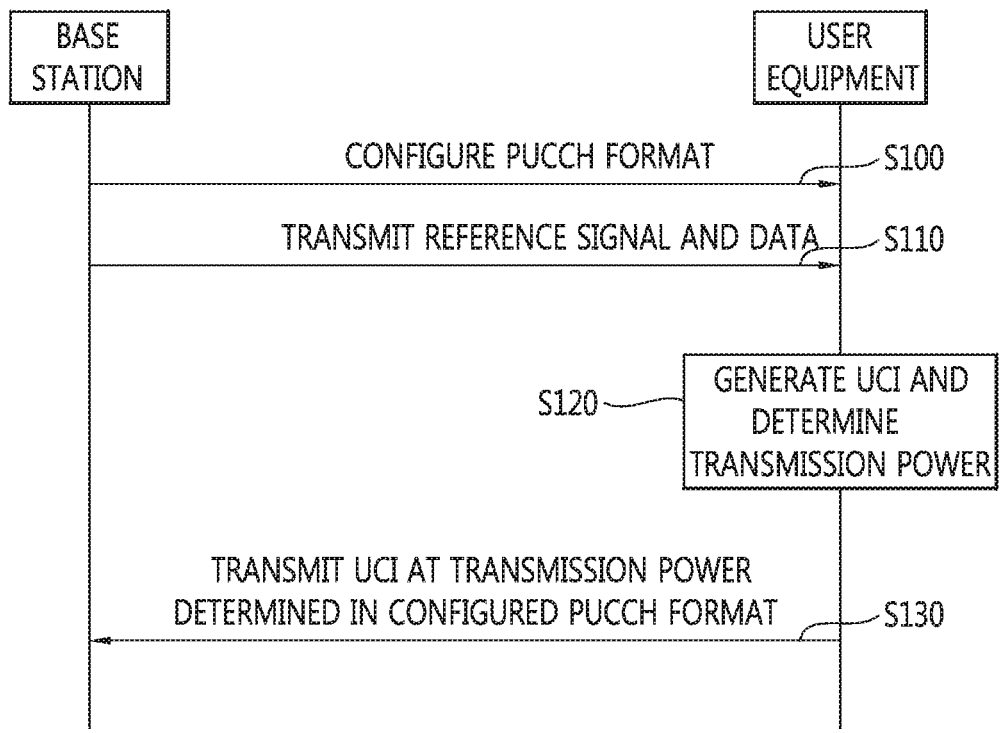
FIG. 15 illustrates a UCI transmitting process through a PUCCH of user equipment.

FIG. 15 illustrates a UCI transmitting process through a PUCCH of user equipment.

Referring to FIG. 15, a base station configures a PUCCH format for user equipment (S100). The PUCCH format may be, for example, PUCCH format 3.

The base station transmits a reference signal and data to the user equipment (S110). The user equipment generates UCI and determines transmission power (S120). For example, the user equipment generates periodic CSI by using the reference signal and decodes data to generate ACK/NACK according to succeeding in receiving the data.

The user equipment transmits the UCI to the base station by the configured PUCCH format and the determined transmission power (S130). The UCI may vary for each subframe and a collision situation in which the periodic CSI and the ACK/NACK are transmitted in the same subframe.

<Power Control for PUCCH>

In the existing LTE-A, the following power control method is used for efficiently transmitting the PUCCH.

If serving cell c is a primary cell, $P_{PUCCH}$, transmission power for transmitting the PUCCH is defined as illustrated in an equation given below.

$$P_{PUCCH}(i) = \min\begin{Bmatrix} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{Bmatrix} \quad \text{[Equation 2]}$$

[dBm]

If the user equipment does not transmit the PUCCH in the primary cell, the user equipment assumes $P_{PUCCH}$, the transmission power for transmitting the PUCCH in subframe i as illustrated in an equation give below, in order to accumulate TPC commands received in DCI format 3/3A.

$$P_{PUCCH}(i) = \min\{P_{CMAX,c}(i), P_{0\_PUCCH} + PL_c + g(i)\} \quad \text{[dBm]} \quad \text{Equation 3}$$

In the equation, $P_{CMAX,c}(i)$ represents the transmission power of the user equipment configured for serving cell c in subframe i.

$\Delta_{F\_PUCCH}(F)$ represents a parameter given as a higher layer signal. Each $\Delta_{F\_PUCCH}(F)$ value is a value relatively given for PUCCH format (F) based on PUCCH format 1a. F may be 1, 1a, 1b, 2, 2a, 2b, or 3.

If the user equipment is configured by a higher layer so as to transmit the PUCCH through two antenna ports, a value of $\Delta_{TxD}(F')$ is given by the higher layer and if not, $\Delta_{TxD}(F')=0$.

$h(n_{CQI}, n_{HARQ}, n_{SR})$ is a PUCCH format dependent value and $n_{CQI}$ corresponds to the number of information bits of CQI. If subframe i is configured for an SR for user equipment having no transport block for the UL-SCH, $n_{SR}$ is 1 and if not, $n_{SR}$ is 0. If one serving cell is configured for the user equipment, $n_{HARQ}$ represents the number of A/N bits transmitted in subframe i and if not, $n_{HARQ}$ is defined in Clause 10.1 of "3GPP TS 36.213 V10, Evolved Universal Terrestrial Radio Access (E-UTRA); Physical layer procedures (Release 10)".

That is, in FDD, when two serving cells are configured for the user equipment and PUCCH format 1b channel selection is configured or two or more serving cells are configured for the user equipment and PUCCH format 3 is configured, $n_{HARQ}$ is determined as illustrated in an equation give below.

$$n_{HARQ} = \sum_{c=0}^{N_{cells}^{DL}-1} N_c^{received} \quad \text{[Equation 4]}$$

In the equation, $N^{DL}_{cells}$ represents the number of configured cells and $N^{received}_c$ represents the number of transport blocks or SPS release PDCCHs received in subframe n-4 of serving cell c.

In TDD, when 1) two serving cells are configured for the user equipment and the PUCCH format 1b channel selection is configured or 2) UL-DL configuration 0 is configured for the user equipment and PUCCH format 3 is configured, $n_{HARQ}$ is determined as illustrated in an equation given below $$n_{HARQ} = \sum_{c=0}^{N_{cells}^{DL}-1} \sum_{k \in K} N_{k,c}^{received} \quad \text{[Equation 5]}$$

In Equation 5 given below, $N^{received}_{k,c}$ represents the number of transport blocks or SPS release PDCCHs received in subframe n-4 of serving cell c. k∈K, and K is defined Table 10.1.3.1-1 of 3GPP TS 36.213. V10, Evolved Universal Terrestrial Radio Access (E-UTRA); physical layer procedures (Release 10) and is a set constituted by M elements; that is, $\{k_0, k_1, \ldots, k_{M-1}\}$ (hereinafter, the same as above).

When PUCCH format 3 is configured for TDD UL-DL configurations 1 to 6, or two serving cells are configured, PUCCH format 1b channel selection is configured and M=2 in the TDD, $n_{HARQ}$ is determined as illustrated in an equation give below.

$$n_{HARQ} = \sum_{c=0}^{N_{cells}^{DL}-1} \left( ((V_{DAI,c}^{DL} - U_{DAI,c}) \bmod 4) \cdot n_c^{ACK} + \sum_{k \in K} N_{k,c}^{received} \right) \quad \text{[Equation 6]}$$

In Equation 6 given above, $V^{DL}_{DAI,c}$ represents $V^{DL}_{DAI}$ in serving cell c. $U_{DAI,c}$ represents $U_{DAI}$ in serving cell c. $n^{ACK}_c$ represents the number of HARQ-ACK bits corresponding to a downlink transmission mode configured in serving cell c.

When spatial HARQ-ACK bundling is applied to serving cell c, $n^{ACK}_c=1$ and $N^{received}_{k,c}$ represents the number of PDSCHs received with no corresponding PDCCH or PDCCHs received in subframe n-k of serving cell c.

When the spatial HARQ-ACK bundling is not applied to serving cell c, $N^{received}_{k,c}$ represents the number of transport blocks or SPS release PDCCHs received in subframe n-k of serving cell c.

If the transport block or the SPS release PDCCH is not detected in subframe n-k, $V^{DL}_{DAI,c}$ is 0.

In the case where the PUCCH format 1b channel selection is configured and M=3 or 4 in the TDD in which two serving cells are configured, if the user equipment receives the PDSCH or the PDCCH (SPS release PDCCH) for indicating downlink SPS release only in subframe n-k of one serving cell, $n_{HARQ}$ is 2 and if not, $n_{HARQ}$ is 4.

For PUCCH formats 1, 1a, and 1b, $h(n_{CQI}, n_{HARQ}, n_{SR})=0$.

For the PUCCH format 1b channel selection, if: two or more serving cells are configured for the user equipment; $h(n_{CQI}, n_{HARQ}, n_{SR})=(n_{HARQ}-1)/2$ and if not, $h(n_{CQI}, n_{HARQ}, n_{SR})=0$.

For PUCCH formats 2, 2a, and 2b and a normal CP, $h(n_{CQI}, n_{HARQ}, n_{SR})$ is illustrated by an equation given below.

$$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases} \quad [\text{Equation 7}]$$

For PUCCH formats 2, 2a, and 2b and an extended CP, $h(n_{CQI}, n_{HARQ}, n_{SR})$ is illustrated by an equation given below.

$$h(n_{CQI}, n_{HARQ}, n_{SR}) = \begin{cases} 10\log_{10}\left(\frac{n_{CQI}+n_{HARQ}}{4}\right) & \text{if } n_{CQI}+n_{HARQ} \geq 4 \\ 0 & \text{otherwise} \end{cases} \quad [\text{Equation 8}]$$

For PUCCH format 3, if the user equipment is configured to transmit the PUCCH through two antenna ports by the higher layer or the user equipment transmits HARQ-ACK/SR more than 11 bits, $h(n_{CQI}, n_{HARQ}, n_{SR})$ is illustrated by an equation given below.

$$h(n_{CQI}, n_{HARQ}, n_{SR}) = \frac{n_{HARQ}+n_{SR}-1}{3} \quad [\text{Equation 9}]$$

If not, $h(n_{CQI}, n_{HARQ}, n_{SR})$ is illustrated by an equation given below.

$$h(n_{CQI}, n_{HARQ}, n_{SR}) = \frac{n_{HARQ}+n_{SR}-1}{2} \quad [\text{Equation 10}]$$

$P_{O\_PUCCH}$ represents a parameter configured by the sum of parameters $P_{O\_NOMINAL\_PUCCH}$ and $P_{O\_UE\_PUCCH}$ provided by the higher layer.

$\delta_{pucch}$ represents a user equipment specific correction value, and is associated with a TPC command transmitted within being joint-coded with other user equipment specific PUCCH correction value in a PDCCH including DCI format 1A/1B/1D/1/2A/2/2B/2C for the primary cell and a PDCCH including DCI format 3/3A in which CRC parity bits are scrambled by a TPC-PUCCH-RNTI.

The user equipment attempts to decode the TPC-PUCCH-RNTI in all subframes other than a DRX and attempts to decode one or a plurality of PDCCHs having DCI format 1A/1B/1D/1/2A/2/2B/2C by a C-RNTI or SPS C-RNTI.

If the user equipment decodes the PDCCH including DCI format 1A/1B/1D/1/2A/2/2B/2C for the primary cell, a corresponding detected RNTI is the same as the C-RNTI or SPS C-RNTI, and a TPC field included in the DCI format is not used to determine a PUCCH resource, the user equipment uses $\delta_{pucch}$ provided in the PDCCH.

Otherwise, if the user equipment decodes the PDCCH including DCI format 3/3A, the user equipment uses $\delta_{pucch}$ provided in the PDCCH and if not, $\delta_{pucch}$ is set to 0 dB.

g(i) represents a current PUCCH power control adjustment state and g(0) is a first value after resetting. g(i) may be expressed as an equation given below.

$$g(i) = g(i-1) + \sum_{m=0}^{M-1} \delta_{PUCCH}(i-k_m) \quad [\text{Equation 11}]$$

In the FDD, M=1 and $k_0$=4.

In the TDD, M represents the number of DL subframes corresponding to one UL subframe and $k_m$ represents a subframe corresponding to the relevant UL subframe, that is, subframe n-$k_m$.

A value of $\delta_{pucch}$ signaled through the PDCCH having DCI format 1A/1B/1D/1/2A/2/2B/2C is given by Table 7.

TABLE 7

| TPC Command Field in DCI format 1A/1B/1D/1/2A/2B/2C/2/3 | $\delta_{PUCCH}$ [dB] |
|---|---|
| 0 | 1 |
| 1 | 0 |
| 2 | 1 |
| 2 | 2 |

If the PDCCH having DCI format 1/1A/2/2A/2B/2C is authenticated as an SPS activated PDCCH or the PDCCH having DCI format 1A is authenticated as the SPS activated PDCCH, $\delta_{pucch}$ becomes 0 dB.

A value of $\delta_{pucch}$ signaled through the PDCCH having DCI format 3/3A is given as Table 7 or Table 8. Which one of Tables 7 and 8 is to be used is semistatically set by the higher layer.

TABLE 8

| TPC Command Field in DCI format 3A | $\delta_{PUCCH}$ [dB] |
|---|---|
| 0 | −1 |
| 1 | 1 |

If a value of $P_{O\_UE\_PUCCH}$ is changed by the higher layer, g(0)=0 and if not, g(0) is given as Equation. 12.

$$g(0) = \Delta P_{rampup} + \delta_{msg2} \quad [\text{Equation 12}]$$

In FIG. 12 given above, $\delta_{msg2}$ represents a TPC command indicated in a random access response and $\Delta P_{rampup}$ represents a total power increase from a first preamble to a last preamble provided by the higher layer.

If the user equipment reaches $P_{CMAX,c}(i)$ for the primary cell, positive TPC commands for the primary cell are not accumulated.

If the user equipment reaches minimum power, negative TPC commands are not accumulated.

The user equipment resets accumulation 1) when the value of $P_{O\_UE\_PUCCH}$ is changed by the higher layer and 2) when a random access response message is received.

If subframe I is not the uplink subframe in the TDD, $g(i)=g(i-1)$.

In LTE Rel-8, periodic CQI transmission is configured in a subframe without PUSCH transmission, and the periodic CQI transmission and HARQ ACK/NACK (A/N) (may be represented as HARQ-ACK, ACK/NACK) transmission may collide with each other. In this case, if simultaneous transmission of the A/N and the periodic CQI is configured to be possible, the A/N is multiplexed by using a scheme of modulating a phase of a second reference signal symbol of PUCCH format 2 in which the periodic CQI is transmitted.

In LTE-A, transmission of a plurality of A/Ns for PDSCHs or PDCCHs of a plurality of cells may be requested in one subframe and if the PUSCH is not transmitted in the subframe, a method that multiplexes the CSI and the A/N and transmits the multiplexed CSI and A/N is required through a UL control channel (that is, PUCCH).

Meanwhile, in LTE-A Rel-10, PUCCH format 3 which is a new PUCCH format is introduced for a case of transmitting the A/Ns for the PDSCHs/PDCCHs of the plurality of cells, but PUCCH Format 3 is used for only transmission of the A/Ns for the PDSCHs/PDCCHs of the plurality of cells and when A/N transmission and CSI transmission for the PDSCHs/PDCCHs of the plurality of cells collide with each other, the CSI is dropped.

However, in order to reduce performance deterioration by a frequent CSI drop in future release (that is, LTE-A Rel-11 or more), simultaneous transmission of the A/N and the CSI (for a plurality of downlink cells) for the PDSCHs/PDCCHs of the plurality of cells to one uplink control channel (e.g., PUCCH format 3) is considered.

The present invention proposes a power control method of the uplink control channel depending on a UCI configuration and the bit number when the periodic CSI and the A/N (and/or SR) are multiplexed, and as a result, simultaneous transmission of the periodic CSI and the A/N to the same uplink control channel is configured.

Hereinafter, the CSI may be limited to the periodic CSI other than aperiodic CSI. Further, hereinafter, using RM coding in a channel coding scheme is exemplified for easy description, but it is apparent that other coding schemes may be applied. In addition, when a plurality of RM coding operations are used, dual RM in which two RM coding blocks are used is exemplified, but even when two or more RM coding blocks are used, the present invention may be extensively applied. Further, PUCCH format 3 is exemplified as a UL channel in which coded control information is transmitted, but the present invention is not limited thereto and the present invention may be applied to a case in which control information is transmitted through PUCCH format 3, the PUSCH, and the like to reduce a spreading factor.

UCIs transmitted through the uplink include the A/N, the SR, the CSI, and the like, and in general, a transmission priority/throughput requirement of an A/N that directly influences a downlink (DL) system throughput and an SR that requests scheduling of a UL data channel for uplink data transmission is set to be high and a transmission priority/throughput requirement of the CSI is set to be low. For example, allowable reception error rate of the A/N is set to $10^{-3}$, while allowable reception error rate is known as $10^{-1}$.

Further, the UCIs transmitted in the PUCCH format are separately coded for each UCI and respective coded bits are rate-matched to be transmitted with being mapped to the PUCCH format. Alternatively, all UCIs are joint-coded and the coded bits are thus rate-matched to be transmitted with being mapped to the PUCCH format.

$$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{array}\right\}$$ [Equation 13]

As described above, Equation 13 is an equation to determine the transmission power in the PUCCH, and $h(n_{CQI}, n_{HARQ}, n_{SR})$ is a PUCCH format dependent value and determined according to the number of bits of UCI transmitted in a corresponding format.

$\Delta_{F\_PUCCH}$ (F) configured in the existing PUCCH format 3 may be applied in the joint coding, and $\Delta_{F\_PUCCH}$ (F) configured in a modified format of PUCCH format 3 or a new PUCCH format (for example, PUCCH format 4) may be applied in individual coding.

A method for configuring $h(n_{CQI}, n_{HARQ}, n_{SR})$ is described. For easy description, hereinafter, input UCI before coding in an encoder is represented by UCI raw and output UCI generated as a result of coding is represented by UCI_coded.

A. Power control method depending on UCI having the highest priority when all UCI is joint-coded and transmitted.

When joint-coding is to be used for UCI transmission, it is not easy to control error rate for each type of UCI_raw in decoding at a receiver. In particular, it is not easy to control the error rate in cases other than the UCI_raw is preprocessed (for example, the UCI having a high priority is preencoded). Therefore, although an error requirement condition of the CSI is low, the transmission power may be up-controlled so as to meet the same error requirement as the A/N (alternatively, SR).

That, is, when various types of UCI (A/N, SR, CQI, and the like) having different priorities are joint-coded and transmitted, the power transmission may be configured according to the UCI (A/N and/or SR) having the high priority. When the transmission power is expressed by an equation, the transmission power may be represented by Equation 14.

$$h(n_{CQI}, n_{HARQ}, n_{SR}) = \frac{n_{HARQ} + n_{SR} + n_{CQI} - 1}{3}$$ [Equation 14]

$$h(n_{CQI}, n_{HARQ}, n_{SR}) = \frac{n_{HARQ} + n_{SR} + n_{CQI} - 1}{2}$$ [Equation 15]

When PUCCH format 3 is applied, Equation 14 represents) $h(n_{CQI}, n_{HARQ}, n_{SR})$ when a total sum of the A/N, the SR, and the CSI is larger than 11 (in the case of the dual RM coding) and Equation 15 represents other case $h(n_{CQI}, n_{HARQ}, n_{SR})$. That is, the number of payload bits of the CSI may be included and applied into a power transmission equation when only the existing A/N (+SR) is to be transmitted. Herein, the CSI is transmitted through a single antenna port and transmission diversity to a plurality of antenna ports is applied, the transmission power may be separately defined.

That is, since the periodic CSI is dropped when the ACK/NACKs for the plurality of cells and the periodic CSI collide with each other in the same subframe, in PUCCI format 3 in the related art, Equations 9 and 10 described above may be used for determining the transmission power of the PUCC. However, after LTE-A release 11, when multiplexing and transmitting the ACK/NACKs for the plurality of cells and the periodic CSI in the same subframe may be supported. Accordingly, it may be necessary to determine the transmission power of the PUCCH by Equations 14 and 15 instead of Equations 9 and 10 described above.

Figure 16:
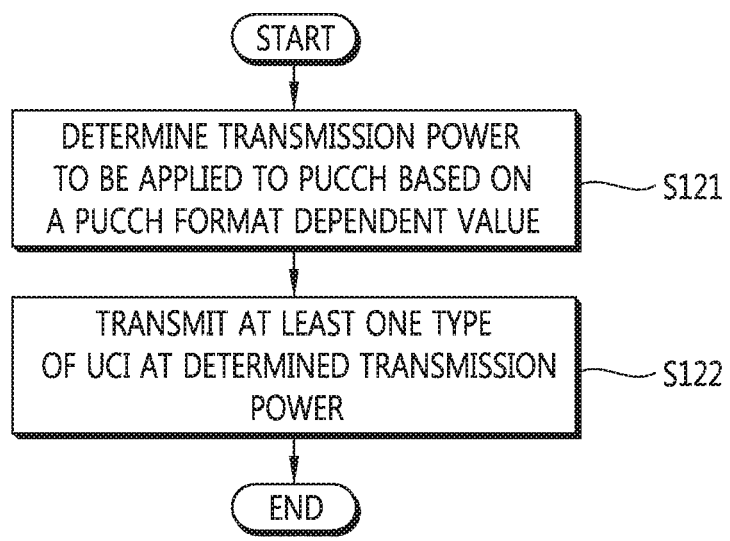
FIG. 16 illustrates a method for determining transmission power for a PUCCH of user equipment according to an embodiment of the present invention.

FIG. 16 illustrates a method for determining transmission power for a PUCCH of user equipment according to an embodiment of the present invention.

The user equipment determines the transmission power to be applied to the PUCCH based on the PUCCH format dependent value (S121). The PUCCH format may be divided into PUCCH formats 1, 1a, 1b, 2, 2a, 2b, and 3 according to the modulation scheme and the number of bits transmitted in the subframe. The PUCCH format dependent value may be $h(n_{CQI}, n_{HARQ}, n_{SR})$ described above. The user equipment determines transmission power to be applied to the uplink control channel of the subframe based on the value.

The user equipment transmits at least one type of UCI at the transmission power determined in the uplink control channel (S122). The PUCCH format is PUCCH format 3 and when at least one type of UCI includes the acknowledgement/not-acknowledgement (ACK/NACK) and the periodic channel state information (CSI), the PUCCH format dependent value is determined based on the number of bits of the ACK/NACK and the number of bits of the periodic CSI. That, is, in the case where the total sum of the UCI is larger than 11 bits upon single antenna port transmission or PUCCH format 3 is configured to be transmitted through two antenna ports, it is determined that $h(n_{CQI}, n_{HARQ}, n_{SR})$ the PUCCH format dependent value is equal to $(n_{HARQ}+n_{SR}+n_{CQI}-1)/3$ and in other cases (for example, in the case where the total sum of the UCI is equal to or smaller than 11 bits upon the single antenna port transmission), it may be determined that determined as $h(n_{CQI}, n_{HARQ}, n_{SR})=(n_{HARQ}+n_{SR}+n_{CQI}-1)/2$. $n_{HARQ}$ represents the number of bits of the ACK/NACK, $n_{CQI}$ represents the number of bits of the periodic CSI, and $n_{SR}$ is 1 in the case where the subframe is configured for a scheduling, request (SR) and 0 in other cases.

Further, in the case where PUCCH format 3 is configured, and the at least one type of UCI includes only the acknowledgement/not-acknowledgement (ACK/NACK) or the scheduling request (SR) without the periodic CSI and the total sum of the UCI is larger than 11 bits or in the case where the UCI is configured by the higher layer by transmitting the PUCCH through two antenna ports, the PUCCH format dependent value ($h(n_{CQI}, n_{HARQ}, n_{SR})$) may be determined as $h(n_{CQI}, n_{HARQ}, n_{SR})=(n_{HARQ}+n_{SR}-1)/3$ and in other cases, (for example, in the case where the total sum of the UCI is equal to or smaller than 11 bits upon the single antenna port transmission), it may be determined that $h(n_{CQI}, n_{HARQ}, n_{SR})=(n_{HARQ}+n_{SR}-1)/2$.

When the ACK/NACK is transmitted through modulation of the reference signal symbol included in PUCCH format 3, the number of bits of the ACK/NACK transmitted through the modulation of the reference signal symbol may not be included in $n_{HARQ}$. The ACK/NACK (when the SR is present, the SR is also included) may mean the ACK/NACK transmitted joint-coded with the periodic CSI and may not include the ACK/NACK transmitted by the modulation of the reference signal symbol.

In Equations 14 and 15, the CSI is transmitted at the transmission power according to the same error requirement as the A/N (and SR) and Equations 14 and 15 may be applied only when the A/N (and SR) is present (that is, in the case of $n_{HARQ}+n_{SR}>0$).

When the A/N (and SR) is not present and only the CSI is present (that is, when $n_{HARQ}+n_{SR}=0$ or when the CSI and the SR are simultaneously transmitted by configuring the error requirement of the SR to be the same as the CSI, $n_{HARQ}=0$), a separate scheme according to the error requirement may be applied.

Alternatively, Equations 14 and 15 may be applied only when $n_{HARQ}+n_{SR}+n_{RI\ series}>0$. Alternatively, when the CSI and the SR are simultaneously transmitted by configuring the error requirement of the SR to be the same as the CSI, Equations 14 and 15 may be applied only when $n_{HARQ}+n_{RI\ series}>0$.

The aforementioned method may be applied only when a PUCCH format 3 resource indicated by the ARI is used. That is, in the case of PUCCH format 3 using one resource designated by the RRC without indication by the ARI, other scheme may be applied. Alternatively, the aforementioned method may be applied may be applied regardless of the presence of the A/N (+SR) for simple implementation.

A-1. Power control configuration method when only UCI having low priority is transmitted.

In the related art, in Equation 13, $\Delta_{F\_PUCCH}$ (F) and $h(n_{CQI}, n_{HARQ}, n_{SR})$ may be offset values and are determined by a parameter 'deltaF-PUCCH-Format3-r10'. Since the transmission powers of the A/N and the CSI are determined according to the error requirement of the A/N in method A described above, it is preferable that a value applied when only the A/N is transmitted is adapted as $\Delta_{F\_PUCCH}$ (F).

In the case where only the CSI is transmitted (for example, in the case where $n_{HARQ}+n_{SR}=0$ or in the case where the CSI and the SR are simultaneously transmitted by configuring the error requirement of the SR to be the same as the CSI, $n_{HARQ}=0$), one of the following methods may be used in order to avoid undesired power allocation over the error requirement of the CSI.

1) Method of using $\Delta_{F\_PUCCH}$ ($H_{CQI\_only}$) which is different from the case of transmitting only the A/N and using $h(n_{CQI}, n_{HARQ}, n_{SR})$ which is the same as the case of transmitting only the A/N. For example, when the parameter may be represented by $\Delta_{F\_PUCCH}$ ($F_{CQI\_only}$) in the case where only the CQI is transmitted in a specific PUCCH format and the parameter is represented by $\Delta_{F\_PUCCH}$ (F) in the case where only the A/N is transmitted, it may be set that $\Delta_{F\_PUCCH}$ ($F_{CQI\_only}$)<$\Delta_{F\_PUCCH}$.

2) Method of using $\Delta_{F\_PUCCH}$ ($F_{CQI-only}$) which is the same as the case of transmitting only the A/N and using $h(n_{CQI}, n_{HARQ}, n_{SR})$ in which is different from the case of transmitting only the A/N.

For example, in the case where the total number of bits of the A/N, the SR, and the CSI is larger than 11 bits, $h(n_{CQI}, n_{HARQ}, n_{SR})$ of Equation 13 may be modified to that of Equation 16 given below and in other cases, $h(n_{CQI}, n_{HARQ}, n_{SR})$ of Equation 13 may be modified to that of Equation 17. Equation 16 may use the dual RM and Equation 17 may use the single RM.

$$h(n_{CQI}, n_{HARQ}, n_{SR}) = \qquad \text{[Equation 16]}$$
$$\frac{n_{HARQ} + n_{SR} + n_{CQI} - 1}{3} - \delta_{CQI\text{-}only} = \frac{n_{CQI} - 1}{3} - \delta_{CQI\text{-}only}$$

$$h(n_{CQI}, n_{HARQ}, n_{SR}) = \qquad \text{[Equation 17]}$$
$$\frac{n_{HARQ} + n_{SR} + n_{CQI} - 1}{2} - \delta_{CQI\text{-}only} = \frac{n_{CQI} - 1}{2} - \delta_{CQI\text{-}only}$$

In Equation given above, $\delta_{CQI\_only} > 0$.

3) Method of using $\Delta_{F\_PUCCH}$(F) which is the same as the case of transmitting only the A/N and $h(n_{CQI}, n_{HARQ}, n_{SR})$ in which a separate weight factor ($w_{CQI\_only}$) which is different from the case of transmitting only the A/N is defined.

For example, in the case where the total number of bits of the A/N, the SR, and the CSI is larger than 11 bits, $h(n_{CQI}, n_{HARQ}, n_{SR})$ of Equation 13 may be modified to that of Equation 18 given below and in other cases, $h(n_{CQI}, n_{HARQ}, n_{SR})$ of Equation 13 may be modified to that of Equation 19. Equation 18 may use the dual RM and Equation 19 may use the single RM.

$$h(n_{CQI}, n_{HARQ}, n_{SR}) = \qquad \text{[Equation 18]}$$
$$\frac{n_{HARQ} + n_{SR} + w_{CQI\text{-}only} \cdot n_{CQI} - 1}{3} = \frac{w_{CQI\text{-}only} \cdot n_{CQI} - 1}{3}$$

$$h(n_{CQI}, n_{HARQ}, n_{SR}) = \qquad \text{[Equation 19]}$$
$$\frac{n_{HARQ} + n_{SR} + w_{CQI\text{-}only} \cdot n_{CQI} - 1}{2} = \frac{w_{CQI\text{-}only} \cdot n_{CQI} - 1}{2}$$

In Equations 18 and 19 given above, $0 < w_{CQI\_only} < 1$.

4) Method of using $\Delta_{F\_PUCCH}$(F) which is the same as the case of transmitting only the A/N and $h(n_{CQI}, n_{HARQ}, n_{SR})$ in which separate power offset ($\delta_{CQI\_only}$) and weight factor ($w_{CQI\_only}$) which is different from the case of transmitting only the A/N are defined.

For example, in the case where the total number of bits of the A/N, the SR, and the CSI is larger than 11 bits, $h(n_{CQI}, n_{HARQ}, n_{SR})$ of Equation 13 may be modified to that of Equation 20 given below and in other cases, $h(n_{CQI}, n_{HARQ}, n_{SR})$ of Equation 13 may be modified to that of Equation 21. Equation 20 may use the dual RM and Equation 21 may use the single RM.

$$h(n_{CQI}, n_{HARQ}, n_{SR}) = \qquad \text{[Equation 20]}$$
$$\frac{n_{HARQ} + n_{SR} + w_{CQI\text{-}only} \cdot n_{CQI} - 1}{3} - \delta_{CQI\text{-}only} =$$
$$\frac{w_{CQI\text{-}only} \cdot n_{CQI} - 1}{3} - \delta_{CQI\text{-}only}$$

$$h(n_{CQI}, n_{HARQ}, n_{SR}) = \qquad \text{[Equation 21]}$$
$$\frac{n_{HARQ} + n_{SR} + w_{CQI\text{-}only} \cdot n_{CQI} - 1}{2} - \delta_{CQI\text{-}only} =$$
$$\frac{w_{CQI\text{-}only} \cdot n_{CQI} - 1}{2} - \delta_{CQI\text{-}only}$$

In Equations 20 and 2 give above, $0 < w_{CQI\_only} < 1$ and $\delta_{CQI\_only}$ is a real-number value and may be, for example, −1 or 0.

$\Delta_{F\_PUCCH}$ ($F_{CQI\_only}$), $w_{CQI\_only}$, and $\delta_{CQI\_only}$ may be applied only when a value of $n_{CQI}$ is equal to or larger than a specific value ($n_{CQI\_threshold}$) in 1) to 4) described above. If the value of $n_{CQI}$ is smaller than the specific value ($n_{CQI\_threshold}$), $\Delta_{F\_PUCCH}$ ($F_{CQI\_only}$)=$\Delta_{F\_PUCCH}$ (F), $w_{CQI\_only}$=1, and $\delta_{CQI\_only}$=0 may be set.

Alternatively, 1) to 4) described above may be applied only when $n_{HARQ}+n_{SR}+n_{RI\ series}$=0. This is to maintain an error requirement for the RI series information at the same level as A/N because RI series information is relatively high in importance and may be influence even the number of bits of CSI to be transmitter afterwards.

$n_{CQI\_threshold}$ may be set to 4 when the maximum number of bits of the RI series information and 6 when the maximum number of bits of the RI series information is 5. $w_{CQI\_only}$ and $\delta_{CQI\_only}$ may be applied only in cases other than the RI series information.

$\Delta_{F\_PUCCH}$ ($F_{CQI\_only}$), $w_{CQI\_only}$, and $\delta_{CQI\_only}$ May be applied according to a combination of the UCI.

The combination of the UCI may be given by a content combination indicator (CCI) to be described below.

A-2. Definition of $n_{HARQ}$ when the A/N is transmitted by the modulation of the reference signal symbol in PUCCH format 3.

When the ARI may not be received from the PDCCH, the A/N (and/or SR) may be transmitted by modulating the reference signal symbol of PUCCH format 3 deferred in order to transmit the CSI. That is, a method in which the A/N is transmitted through PUCCH format 3 may include 1) a method in which the A/N is transmitted with being jointcoded with the CSI, 2) a method in which the A/N is transmitted by modulating the reference signal transmitted in PUCCH format 3, and the like. Two methods that are provided as described above needs to be reflected to power control.

For example, if the A/N is transmitted by the method of 1), the A/N (and/or SR) in this case, is reflected on $n_{HARQ}$ and when the A/N is transmitted by the method of 2), the A/N (and/or SR) in this case is not reflected on $n_{HARQ}$. The reason is that when the A/N is transmitted by modulating the reference signal, the number of bits of the A/N may be reflected on $\Delta_{F\_PUCCH}$ ($F_{CQI-only}$).

When the A/N is transmitted by modulating the reference signal like 2) described above, a minimum guarantee value of the transmission power may be set. For example, assumed is a case in which the A/N is transmitted by modulating the reference signal symbol in PUCCH format 3 and only the CSI is transmitted in a data symbol of PUCCH format 3. In this case, when the transmission power is determined according to only the error requirement of the CSI, the error requirement of the A/N may not be met. Therefore, unlike the case in which only the CSI is transmitted through PUCCH format 3, in the case where the A/N is transmitted together with the CSI by modulating the reference signal symbol, the transmission power is determined to be equal to or larger than the minimum guarantee value.

To this end, in the equations described in A and A-1 described above, $n_{CQI}$ may be substituted with max($n_{CQI}, n_{CQI\_threshold}$). Alternatively, in the equations described in A and A-1 described above, h' of FIG. 22 may be applied instead of h by setting a minimum guarantee value ($h^{threshold}$) of h.

$$h' = \max(h, h^{threshold}) \qquad \text{[Equation 22]}$$

A-3. Power Control Setting of a Case where Contents Combination Indicator (CCI) Exists The user equipment may joint-code and transmit the CCI and the UCI in order to notify the combination of the UCIs transmitted from the PUCCH format 3. In this case, since the bit number of the CCI is added into the information bits, the bit number of the CCI needs to be reflected to the transmission power method determined according to the number of information bits.

It is assumed that the bit number of the CCI is $N_{CCI}$. Then, $n_{HARQ}$ may be replaced with $n_{HARQ}+N_{CCI}$ in the aforementioned Equations A to A-2. However, the CCI may be transmitted by the reference signal modulation, and in this case, $n_{HARQ}$ is not replaced with $n_{HARQ}+N_{CCI}$. Further, a minimum guarantee value of the transmission power of the CCI may be set. For example, it is assumed that the CCI is transmitted by the reference signal symbol modulation of the PUCCH format 3 and only the CSI is transmitted in the data symbol of the PUCCH format 3. In this case, unlike the case where only the CSI is transmitted through the PUCCH format 3, in the case where the CCI is transmitted by the reference signal symbol modulation together with the CSI, the transmission power is determined to the minimum guarantee value or more.

A-4. Offset Application for a Case where A/N is Transmitted by Reference Signal Modulation of PUCCH Format 3

The user equipment may not receive the ARI indicating the resource of the PUCCH format 3 in the state where the PUCCH format 3 is set. In this case, when the user equipment needs to transmit the A/N in the corresponding subframe, a phase of the reference signal symbol of the PUCCH format 3 is modulated and transmitted, and when the A/N to transmit is not generated and thus the A/N needs not be transmitted, only the CSI may be transmitted. That is, in the state where the PUCCH format 3 is set, in the case where the ARI indicating the resource of the PUCCH format 3 is not received, two cases of transmitting only the CSI or simultaneously transmitting the CSI and the A/N may exist. The transmission power needs to be set by dividing the two cases.

1.) Method of using different $\Delta_{F\_PUCCH}$ ($F_{CQI\_only}$) from the case or transmitting only the A/N and the same $h(n_{CQI}, n_{HARQ}, n_{SR})$ as the case of transmitting only the A/N. For example, in the case where only the CQI is transmitted to a specific PUCCH format, the parameter is represented as $\Delta_{F\_PUCCH}$ ($F_{CQI\_only}$), and in the case of transmitting only the A/N, when the parameter is $\Delta_{F\_PUCCH}$ (F), the parameter may be set to $\Delta_{F\_PUCCH}$ ($F_{CQI\_only}$)<$\Delta_{F\_PUCCH}$ (F).

2) Method of using the same $\Delta_{F\_PUCCH}$ (F) as the case of transmitting only the A/N and different $h(n_{CQI}, n_{HARQ}, n_{SR})$ in which separate power offset $\delta_{ANonRS}$ is defined from the case of transmitting only the A/N.

For example, in the case where a total bit number of the A/N, the SR, and the CSI exceeds 11 bits, $h(n_{CQI}, n_{HARQ}, n_{SR})$ of Equation 13 may be modified to the following Equation 23, and in other cases, may be modified to the following Equation 24. Equation 23 may use the double RM, and Equation 24 may use the single RM.

$$h(n_{CQI}, n_{HARQ}, n_{SR}) = \frac{n_{HARQ} + n_{SR} + n_{CQI} - 1}{3}\delta_{ANonRS} = \frac{n_{CQI} - 1}{3} - \delta_{ANonRS} \quad [\text{Equation 23}]$$

$$h(n_{CQI}, n_{HARQ}, n_{SR}) = \frac{n_{HARQ} + n_{SR} + n_{CQI} - 1}{2} - \delta_{ANonRS} = \frac{n_{CQI} - 1}{2} - \delta_{ANonRS} \quad [\text{Equation 24}]$$

In Equations 23 and 24, $\delta_{CQI\_only}>0$.

3) Method of using the same $\Delta_{F\_PUCCH}$ (F) as the case of transmitting only the A/N and different $h(n_{CQI}, n_{HARQ}, n_{SR})$ in which a separate weight factor $w_{ANonRS}$ is defined from the case of transmitting only the A/N.

For example, in the case where a total bit number of the A/N, the SR, and the CSI exceeds 11 bits, $h(n_{CQI}, n_{HARQ}, n_{SR})$ of Equation 13 may be modified to the following Equation 25, and in other cases, may be modified to the following Equation 26. Equation 25 may use the double RM, and Equation 26 may use the single RM.

$$h(n_{CQI}, n_{HARQ}, n_{SR}) = \frac{w_{ANonRS}(n_{HARQ} + n_{SR} + \cdot n_{CQI}) - 1}{3} = \frac{w_{ANonRS} \cdot n_{CQI} - 1}{3} \quad [\text{Equation 25}]$$

$$h(n_{CQI}, n_{HARQ}, n_{SR}) = \frac{n_{ANonRS}(n_{HARQ} + n_{SR} + \cdot n_{CQI}) - 1}{2} = \frac{w_{ANonRS} \cdot n_{CQI} - 1}{2} \quad [\text{Equation 26}]$$

In Equations 25 and 26, $w_{ANonRS}$ may be a constant (for example, −1).

4) Method of using the same $\Delta_{F\_PUCCH}$ (F) as the case of transmitting only the A/N and different $h(n_{CQI}, n_{HARQ}, n_{SR})$ in which a separate power offset $\delta_{ANonRS}$ and a separate weight factor $w_{ANonRS}$ are defined from the case of transmitting only the A/N.

For example, in the case where a total bit number of the A/N, the SR, and the CSI exceeds 11 bits, $h(n_{CQI}, n_{HARQ}, n_{SR})$ of Equation 13 may be modified to the following Equation 27, and in other cases, may be modified to the following Equation 28. Equation 27 may use the double RM, and Equation 28 may use the single RM.

$$h(n_{CQI}, n_{HARQ}, n_{SR}) = \frac{w_{ANonRS}(n_{HARQ} + n_{SR} + n_{CQI}) - 1}{3} - \delta_{ANonRS} = \frac{w_{CQI\_only} \cdot n_{CQI} - 1}{3} - \delta_{ANonRS} \quad [\text{Equation 27}]$$

$$h(n_{CQI}, n_{HARQ}, n_{SR}) = \frac{w_{ANonRS}(n_{HARQ} + n_{SR} + n_{CQI}) - 1}{2} - \delta_{ANonRS} = \frac{w_{CQI\_only} \cdot n_{CQI} - 1}{2} - \delta_{ANonRS} \quad [\text{Equation 28}]$$

In Equations 27 and 28, $w_{ANonRS}$ may be a constant (for example, −1).

B. Method of controlling transmission power by applying weighted values to UCIs for each priority (error requirement) when all UCIs are joint-coded and transmitted.

In the case where joint-coding is used in all the UCIs, when preprocessing (for example, precoding is performed in a UCI having high priority) is performed in a UCI_raw, or when an average error requirement is fit according to a UCI component ratio, the transmission power may be determined by applying a high weighted value to a payload of the UCI having high priority and applying a low weighted value to a payload of a UCI having low priority.

For example, a weighted value $w_{HARQ}$ applied to an A/N(+SR) may apply a weighted value which is higher than a weighted value $w_{CQI}$ applied to the CSI. In the PUCCH format 3, when a single RM or a double RM is selectively applied according to a bit number, $h(n_{CQI}, n_{HARQ}, n_{SR})$ may be determined according to the following Equations 29 and 30. In the case where a total bit number of the A/N, the SR, and the CSI exceeds 11 bits, $h(n_{CQI}, n_{HARQ}, n_{SR})$ of Equation 13 may be modified to the following Equation 29, and in other cases, may be modified to the following Equation 30. Equation 29 may use the double RM, and Equation 30 may use the single RM.

$$h(n_{CQI}, n_{HARQ}, n_{SR}) = \frac{w_{HARQ}(n_{HARQ} + n_{SR}) + w_{CQI}n_{CQI} - 1}{3} \quad \text{[Equation 29]}$$

$$h(n_{CQI}, n_{HARQ}, n_{SR}) = \frac{w_{HARQ}(n_{HARQ} + n_{SR}) + w_{CQI}n_{CQI} - 1}{2} \quad \text{[Equation 30]}$$

If the error requirement of the A/N is not fit and an increase in an error ratio according to CSI multiplexing is permitted, the weighted value may be set as $w_{HARQ}=1$ and $w_{CQI} \leq$. This may be applied to a case where power requirement per unit resource required for normal reception is reduced, due to an increase in the number of resources to be mapped in the A/N bits in the preprocessing. Further, due to $w_{CQI} \leq 1$, power which is consumed unnecessarily to the CSI transmission may be decreased.

C. Method of setting transmission power by setting a weighted value to a UCI for each priority (error requirement) when each UCI is individually coded and transmitted.

In the case where individual coding is applied for each UCI group, allocation of resource elements (RE) of the PUCCH may be controlled by an error requirement required for each UCI group. In this case, even though the UCI_raw bit number is the same for each UCI group, the transmission power needs to be differently controlled.

For example, a case where the UCI_raw is configured by A/N 10 bit and a case where the UCI_raw is configured by CSI 10 bits are assumed. According to each case, the transmission power needs to be differently controlled. The reason is that the error requirement of each UCI varies.

When $h(n_{CQI}, n_{HARQ}, n_{SR})$ is give as the following Equation 31, the weighted value may be controlled to $w_{HARQ} \geq w_{CQI}$.

$$h(n_{CQI}, n_{HARQ}, n_{SR}) = w_{HARQ}(n_{HARQ} + n_{SR}) + w_{CQI}n_{CQI} + C \quad \text{[Equation 31]}$$

If $n_{CQI} = 0$ and $n_{HARQ} + n_{SR} \leq 11$, the Equation 31 may be configured as the following Equation 32. This is to maintain the same transmission power as the case of transmitting only the A/N.

$$h(n_{CQI}, n_{HARQ}, n_{SR}) = \frac{(n_{HARQ} + n_{SR}) + w'_{CQI}n_{CQI} - 1}{2} \quad \text{[Equation 32]}$$

In Equations 31 and 32, in the case where the coding technique is changed according to a bit number, the weighted values may be set for each coding technique.

In Equations 31 and 32, when a UCI group having high priority is a group 1 and a UCI group having next high priority is a group 2, the groups 1 and 2 may be classified as follows.

1) Group 1={A/N, SR}, Group 2={RI, PTI, W1, W2, CQI}

2) Group 1={A/N, SR, RI, PTI, W1}, Group 2={W2, CQI}, in this case, a weighted value $w_{Group1}$ applied to the group 1 may be larger than a weighted value $w_{Group2}$ applied to the group 2. In this case, $h(n_{Group1}, n_{Group2}) = w_{Group1}n_{Group1} + w_{Group2}n_{Group2} + C$ may be given. That is, the RI, the TPI, the W1, and the like which influence the next information transmission among the CSIs give the same priority as the A/N.

3) Group 1={A/N, SR}, Group 2={RI, PTI, W1}, and Group 3={W2, CQI}, in this case, a weighted value $w_{Group1}$ applied to the group 1, a weighted value $w_{Group2}$ applied to the group 2, and a weighted value $w_{Group3}$ applied to the group 3 may be $w_{Group1} > w_{Group2} > w_{Group3}$. The RI, the TPI, the W1, and the like which influence the next information transmission among the CSIs give a lower priority than the A/N and a higher priority than the CQI. When the groups 2 and 3 are joint-coded, the aforementioned methods A and B may be used.

D. Method of controlling transmission power according to an allocation ratio of a PUCCH resource to which the coded bit of the UCI having the highest priority (error requirement), when each UCI is individually coded and transmitted.

In the case of the PUCCH format 3, a total of 48 resource elements (RE) may be used. That is, $N^{PUCCH}_{RE} = 24$ represents the number of PUCCH available resource elements per slot. In one RE, one modulation symbol may be transmitted. If the UCI is individually coded and the number of REs to be transmitted by the UCI_coded for each UCI is determined according to an error requirement, A/N(+SR) may receive only the REs having the number which is smaller than a case where only the A/N(+SR) is transmitted in the related art. The reason is that some PUCCH REs are allocated to the CSI. The existing transmission power equation is determined based on the number of REs when only the A/N(+SR) is transmitted, and if the existing transmission power equation is equally used when the A/N(+SR) receives the REs having the decreased number, the error requirement may not be satisfied.

In order to solve the problem, considering a ratio of the number of REs (represented by $n^{Group1}_{RE}$ based on one slot, and in the case of the A/N, represented by $n^{A/N}_{RE}$) allocated in the UCI group having the highest priority and the number of available REs (represented by $N^{PUCCH}_{RE}$ based on one slot) of the entire PUCCH format, the transmission power may be determined. For example, when the number of REs allocated to the UCI group having top priority is decreased, the transmission power of the UCI group having the top priority is decreased according to a ratio of the decreased number of REs and the number of available REs of the entire PUCCH format.

Alternatively, the transmission power may be compensated by a ratio of the entire available resource (for example, bit number) of the PUCCH and an allocation resource (bit number). This may be represented as the following Equations 33 and 34. That is, in the case where a total bit number of the A/N, the SR, and the CSI exceeds 11 bits, $h(n_{CQI}, n_{HARQ}, n_{SR})$ of Equation 13 may be modified to the following Equation 33, and in other cases, may be modified to the following Equation 34. Equation 33 may use the double RM, and Equation 34 may use the single RM.

$$h(n^{AN}_{RE}, n_{HARQ}, n_{SR}) = \frac{n_{HARQ} + n_{SR} - 1}{3} \cdot \frac{N^{PUCCH}_{RE}}{n^{AN}_{RE}} \quad \text{[Equation 33]}$$

-continued $$h(n_{RE}^{AN}, n_{HARQ}, n_{SR}) = \frac{n_{HARQ} + n_{SR} - 1}{2} \cdot \frac{N_{RE}^{PUCCH}}{n_{RE}^{AN}}$$ [Equation 34]

When the UCI is grouped and a UCI group 1 is configured by {A/N, SR, RI, PTI, W1}, Equations 33 and 34 may be sequentially generalized like the following Equations 35 and 36.

$$h(n_{RE}^{Group1}, n_{Group1}) = \frac{n_{Group} - 1}{3} \cdot \frac{N_{RE}^{PUCCH}}{n_{RE}^{Group1}}$$ [Equation 35]

$$h(n_{RE}^{Group1}, n_{Group1}) = \frac{n_{Group} - 1}{2} \cdot \frac{N_{RE}^{PUCCH}}{n_{RE}^{Group1}}$$ [Equation 36]

Equations 33 and 34 represent h as one equation, and after h is calculated like existing Equation 13, the transmission power may be determined by giving an offset having a ratio such as $N^{PUCCH}{}_{RE}/n^{Group1}{}_{RE}$ as a function. That is, Equations 33 and 34 may be sequentially represented like the following Equations 37 and 38.

$$h(n_{RE}^{AN}, n_{HARQ}, n_{SR}) = \frac{n_{HARQ} + n_{SR} - 1}{3} - \delta\left(\frac{N_{RE}^{PUCCH}}{n_{RE}^{AN}}\right)$$ [Equation 37]

$$h(n_{RE}^{AN}, n_{HARQ}, n_{SR}) = \frac{n_{HARQ} + n_{SR} - 1}{2} - \delta\left(\frac{N_{RE}^{PUCCH}}{n_{RE}^{AN}}\right)$$ [Equation 38]

In the case where the REs to which the UCI_coded of a specific UCI group (for example, UCI group 1) is allocated are decreased, a code ratio for the specific UCI group is increased. A correction value for compensating for the increased code ratio may be applied to the transmission power control. The following Equation 39 is an example applying the correction values b, c, and d. In the example, when there is no UCI of the UCI group 1, the following Equation may be modified to the UCI group 2.

$$h(n_{RE}^{Group1}, n_{Group1}) = \frac{n_{Group1} - 1}{2} \cdot \frac{N_{RE}^{PUCCH} + d}{n_{RE}^{Group1} + c} \cdot b$$ [Equation 39]

Further, in Equation 39, the number of REs allocated to the specific UCI group may be limited to be set to only a minimum guarantee value $N^{threshold}{}_{RE}$ or more. That is, Equation 39 may be modified like the following Equation 40.

$$h(n_{RE}^{Group1}, n_{Group1}) = $$ [Equation 40]

$$\frac{n_{Group1} - 1}{2} \cdot \frac{N_{RE}^{PUCCH} + d}{\max(n_{RE}^{Group1}, N_{RE}^{threshould}) + c} \cdot b$$

Further, in Equations 39 and 40, h may be set to h', and h' if may be max(h, $h^{threshold}$). That is, h is set to guarantee the minimum transmission power of the specific UCI group.

E. Definition of $n_{HARQ}$ when the A/N is transmitted to the PUCCH format 2/2a/2b together with the CSI In a situation where two cells are set to the user equipment, the A/N for a primary cell (in detail, DL PCC) may be transmitted through the PUCCH format 2/2a/2b. In more detail, the A/N may be transmitted through second reference signal symbol modulation of the PUCCH format 2/2a/2b. In addition, the A/N for a secondary cell (DL SCC) is joint-coded with the CSI and transmitted.

In this case, an existing method of controlling transmission power for the PUCCH format 2/2a/2b (normal CP) may be modified like the following Equation 41.

$$h(n_{CQI}, n_{HARQ}, n_{SR}) = $$ [Equation 41]

$$\begin{cases} 10\log_{10}\left(\frac{n_{CQI} + n_{HARQ}}{4}\right) & \text{if } n_{CQI} \geq 4 \\ 0 & \text{otherwise} \end{cases}$$

In Equation 41, $n_{HARQ}$ becomes a bit number of the A/N for the secondary cell without considering the bit number of the A/N for the primary cell. In the case where the A/N is transmitted through the reference signal modulation, the bit number of the A/N is not reflected to $n_{HARQ}$. This is because the bit number of the A/N is reflected to $\Delta_{F\_PUCCH}$ (F).

In a situation where two cells are set to the user equipment, the A/N for the primary cell and the A/N for the secondary cell may be joint-coded with the CSI and transmitted. In this case, the A/N to which spatial bundling is applied for each cell may be transmitted. Even in this case, the existing method of controlling the transmission power needs to be modified. That is, $n_{HARQ}$ may be an actual final bit number of the A/N joint-coded and transmitted.

For example, in the case where the user equipment receives two codewords only in the primary cell, the user equipment may transmit the A/N for the primary cell of 1 bit by spatial bundling, and transmit the A/N field for the secondary cell which is filled similarly as the NACK. In this case, $n_{HARQ}=1$ according to the bundled A/N 1 bit of the primary cell. If the user equipment receives the codeword even in the secondary cell, $n_{HARQ}=2$. $h(n_{CQI}, n_{HARQ}, N_{SR})$ required for determining the transmission power in the PUCCH format 2/2a/2b (normal CP) may be represented by the following Equation 42.

$$h(n_{CQI}, n_{HARQ}, n_{SR}) = $$ [Equation 42]

$$\begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

F. Classification of PUCCH format for $\Delta_{F\_PUCCH}$ (X), when PUCCH format 3 is used In an existing LTE-A Rel-10, a case where the user equipment transmits the A/N by using the PUCCH format 3 is just a case where the user equipment transmits the A/N for a multiple cell. Accordingly, in this case, $\Delta_{F\_PUCCH}$ (PUCCH format 3) is applied to $\Delta_{F\_PUCCH}$ (F).

However, in LTE-A Rel-11, multiplexing and transmitting the A/N for the multiple cells and the CSI through the PUCCH format may be supported. Accordingly, using an existing $\Delta_{F\_PUCCH}$ (PUCCH format 3) as it is may be inefficient. Accordingly, PUCCH format X to apply $\Delta_{F\_PUCCH}$ (X) may be subdivided like the following Table.

TABLE 9

| Index | UCI combination | Classification of PUCCH format X for power control ($\Delta_{F\_PUCCH}$ (X)) |
|---|---|---|
| 1 | Exist only in A/N for multiple cells (or A/N transmitted by resource indicated by ARI) | PUCCHformat 3 (apply the same error requirement as A/N) |
| 2 | A/N for multiple cells (or A/N transmitted by resource indicated by ARE) and CSI (Joint coding) | |
| 3 | A/N for single cell (or A/N transmitted without ARI) and CSI (Joint coding) | |
| 4 | Exist only CSI (a case where some CSI (for example, RI, PTI, WI, (PMI), or only CIS in the same format exist (s)) or CSI and A/N having the same error requirement) | |
| 5 | Exist only CSI | PUCCH format 3A (Fit CSI error requirement to $\Delta_{F\_PUCCH}$ (X)) |
| 6 | A/N for single cell (or A/N transmitted without ARI) and CSI (1-bit A/N is transmitted by reference signal modulation) | PUCCH format 3B0 (Control according to reference signal modulation) |
| 7 | CCI and any UCI (1-bit CCI is transmitted by reference signal modulation) | |
| 8 | A/N for single cell (or A/N transmitted without ARI) and CSI (2-bit A/N is transmitted by reference signal modulation) | PUCCH format 3B1 (Control according to reference signal modulation) |
| 9 | CCI and any UCI (2-bit CCI is transmitted by reference signal modulation) A/N for single cell (or A/N transmitted without ARI) and CSI (individual coding) A/N for multiple cells (or A/N transmitted by resource indicated by ARI) and CSI (individual coding) | PUCCH format 3C (Control according to individual coding) |

In Table 1, the indexes {1} and {2, 3, 4} may be classified by different formats because a permitted UCI combination varies according to a version (release) operated by the user equipment. In the fitting of the same error requirement as the A/N, the same offset value may be applied by the indexes {1} and {2, 3, 4}, but different values may be applied.

In Table 9, the indexes {4} and {5} may be classified according to a CSI content. In the case of being applied to {4}, a UCI having a relatively high error requirement which influences subsequent CSI transmission may be included in addition to the RI.

Meanwhile, in Table 9, {4} and {5} are classified by whether the error requirement is reflected from any place when Only he CSI exists. Unlike {1, 2, 3}, the error requirement may be separately reflected by offsetting, but the error requirement may be reflected by varying h by a separate condition in the same format.

Alternatively, in Table 9, in order to simplify the implementation, the format 3B0 may be integrated with the format 3B1.

In Table 9, the same format means using the same $\Delta_{F\_PUCCH}$ (F). Even though a format title varies according to the UCI combination, in the case of the same format title, the same $\Delta_{F\_PUCCH}$ (F) is used.

G. Setting of $n_{CQI}$ value applied to transmission power control of PUCCH in the case where a length (bit number) of a CQI bit field is determined based on the set cell, when the A/N and the CSI are multiplexed to the PUCCH format.

In an existing LTE-A, when the CSI is transmitted to the PUCCH format 2, the CSI is transmitted to only the activated cell. When CSIs for a plurality of activated cells collide with each other in the CSI transmission subframe, according to a priority rule predetermined according to a CSI reporting type and a subcarrier index value, only the CSI for one cell having high priority is transmitted, and the CSIs for other cells are dropped.

Here, a length of an input CSI bit field of an RM encoder used by channel coding of the PUCCH format 2 by the user equipment is determined by the selected CSI reporting type to be actually transmitted.

Meanwhile, as described above, in the case where the A/N and the CSI are multiplexed and transmitted in the PUCCH format (for example, PUCCH format 3), the length of the input CSI bit field of an RM encoder used by channel coding is selected based on the set cell unlike the case where only the CSI is transmitted to the PUCCH format 2, and as a result, selection of the coding technique (that is, single RM or double RM), setting of a rate matching ratio of the A/N and the CSI, and the like may be performed. Here, since CSI information for the deactivated cell is not useful, the CSI content (CSI reporting type) which is actually transmitted to the corresponding CSI bit field may become a value selected based on the activated cell like the PUCCH format 2, and the remaining bits may be filled by 0 (or 1). That is, the length of the CSI bit field may be larger than or the same as the bit number of the CSI reporting type actually transmitted.

The reason for determining the length of the CSI bit field based on the set cell as described above is that the length of the CSI bit field may vary by the priority rule when misalignment for cell activation/deactivation between the user equipment and the base station occurs in the case where the length of the CSI bit field is set based on the activated cell, and as a result, the selection of the coding technique or the setting of a rate matching ratio of the A/N and the CSI varies, thereby influence even decoding of the CSI and the A/N.

Accordingly, when the length of the CSI bit field and the bit number of the CSI reporting type transmitted from the CSI bit field are different from each other, $n_{CQI}$ applied to the PUCCH power control may use one of two methods below.

1) Method of setting a $n_{CQI}$ value to a bit number of the CSI reporting type actually transmitted: In the case where misalignment for the CIS content does not occur because the misalignment for cell activation/deactivation between the user equipment and the base station occurs, since the base station may know information on the length of the CSI content transmitted actually, the decoder of the base station has only to perform full search for the CSI content transmitted actually without requiring the full search with respect to the combination of all the CSI bit fields. Accordingly, it is sufficient to allocate the transmission power according to the bit number of the CSI reporting type transmitted actually (for example, the bit number of the CSI reporting type selected based on the activated cell). As a result, in the case where an error of cell activation/deactivation occurs small, for effective management of the transmission power of the user equipment, it is useful to set the $n_{CQI}$ value to the bit number of the CSI reporting type transmitted actually instead of the length of the CSI bit field.

Method of setting $n_{CQI}$ value to length of CSI bit field: Since the misalignment of cell activation/deactivation between the user equipment and the base station occurs, the misalignment even in the CSI content may occur. In this case, a basis sequence which is unexpected by the base station may be included in the CSI content transmitted by the user equipment. For example, in the case where more CSI contents than the CSI contents selected based on the activated cell without an error is selected by the error, the basis sequence in which excess CSI bits are mapped may be included. In the case of attempting the decoding without considering this, decoding performance of the entire encoded bits including the A/N may deteriorate. Accordingly, when the error of cell activation/deactivation occurs large, even though the decoder of the base station attempts the decoding by fully researching the combination of the entire CSI bit fields, it is useful to sufficiently allocate the transmission power by setting the $n_{CQI}$ value to the length of the CSI bit field (for example, the bit number selected based on the set cell) so that there is no performance degradation.

Figure 17:
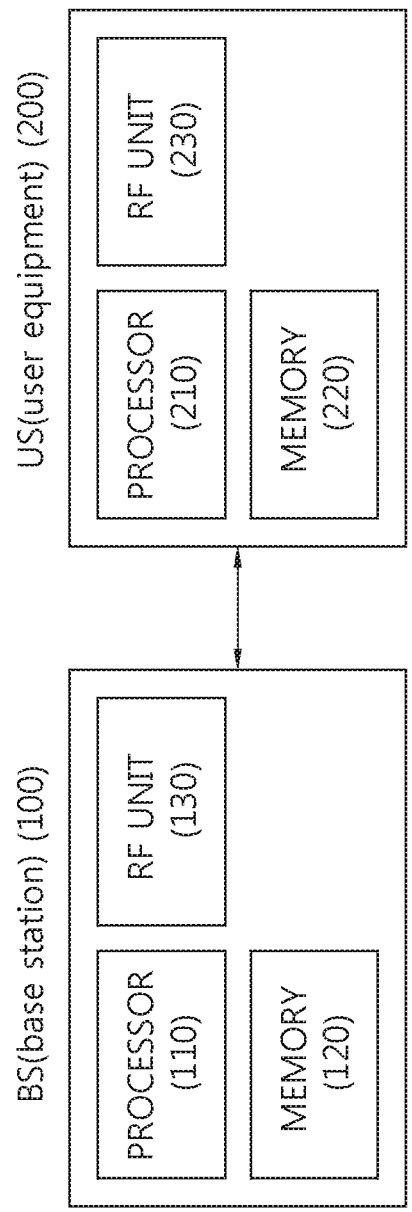
FIG. 17 is a block diagram illustrating a base station and user equipment in which the embodiment of the present invention is implemented.

FIG. 17 is a block diagram illustrating a base station and user equipment in which the embodiment of the present invention is implemented.

A base station 100 includes a processor 110, a memory 120, and a radio frequency (RF) unit 130. The processor 110 implements a function, a process, and/or a method which are proposed. Layers of a wireless interface protocol may be implemented by the processor 110. The processor 110 sets a PUCCH format in which user equipment will transmit UCI through a higher layer signal such as an RRC message, transmits the user equipment a reference signal and data, and receives the UCI from the user equipment. The memory 120 is connected with the processor 110 to store various pieces of information for driving the processor 110. The RF unit 130 is connected with the processor 110 to transport and/or receive the radio signal.

A UE 200 includes a processor 210, a memory 220, and an RF unit 230. The processor 210 implements a function, a process, and/or a method which are proposed. Layers of a wireless interface protocol may be implemented by the processor 210. The processor 210 sets the PUCCH format through the higher layer signal and sets the serving cells. The processor 210 determines transmission power to be applied to a PUCCH based on a subordinate to the PUCCH format and thereafter, transmits at least one type of UCI through the PUCCH at the transmission power. The memory 220 is connected with the processor 210 to store various pieces of information for driving the processor 210. The RF unit 230 is connected with the processor 210 to transport and/or receive the radio signal.

The processors 110 and 210 may include an application-specific integrated circuit (ASIC), another chip set, a logic circuit and/or a data processing apparatus. The memories 120 and 220 may include a read-only memory (ROM), a random access memory (RAM), a flash memory, a memory card, a storage medium, and/or another storage device. The RF units 130 and 230 may include a baseband circuit for processing the radio signal. When the embodiment is implemented by software, the aforementioned technique may be implemented by a module (a process, a function, and the like) that performs the aforementioned function. The module may be stored in the memories 120 and 220, and executed by the processors 110 and 210. The memories 120 and 220 may be provided inside or outside the processors 110 and 210 and connected with the processors 110 and 210 by various well-known means.

What is claimed is:

1. A method, comprising:
    transmitting, by a base station, data to a user equipment (UE); and
    receiving, by the base station, at least one type of uplink control information (UCI) that is transmitted from the UE through a physical uplink control channel (PUCCH) of a subframe, wherein transmission power of the PUCCH is determined by the UE based on a PUCCH format dependent value, and when the UE transmits acknowledgement/negative acknowledgement (ACK/NACK) information for the data and periodic channels state information (CSI) using a PUCCH format 3:
    if the PUCCH format 3 is configured to be transmitted through two antenna ports or if a total sum of the ACK/NACK information and the periodic CSI is larger than 11 bits, the PUCCH format dependent value is determined based on the following equation:

$$h(nCQI, nHARQ, nSR) = (nHARQ + nSR + nCQI - 1)/3,$$
    wherein h(nCQI, nHARQ, nSR) represents the PUCCH format dependent value, nHARQ represents a number of bits of the ACK/NACK information, nCQI represents a number of bits of the periodic CSI, and nSR is 1 or 0; or
    if PUCCH format 3 is configured to be transmitted through a single antenna port and if a total sum of the ACK/NACK information and the periodic CSI is equal to or smaller than 11 bits, the PUCCH format dependent value is determined based on the following equation:

$$h(nCQI, nHARQ, nSR) = (nHARQ + nSR + nCQI - 1)/2.$$

2. The method of claim 1, wherein the PUCCH format 3 is a PUCCH format that uses quadrature phase shift keying (QPSK) as a modulation scheme and in which 48 bits can be transmitted.

3. The method of claim 1, wherein when the UE transmits second ACK/NACK information and a scheduling request (SR) through the PUCCH format 3:
    if a total sum of the second ACK/NACK information and the SR is larger than 11 bits or if the UE is configured to transmit the PUCCH format 3 on two antenna ports, the PUCCH format dependent value is determined based on the following equation:

$$h(nCQI, nHARQ, nSR) = (nHARQ + nSR - 1)/3; \text{ or}$$

otherwise, the PUCCH format dependent value is determined based on the following equation:

$$h(nCQI, nHARQ, nSR) = (nHARQ + nSR - 1)/2.$$

4. The method of claim 1, wherein the nSR is 1 if a subframe used for transmitting the at least one type of UCI is configured for a scheduling request (SR) for the UE not having any associated transport block for uplink shared channel (UL-SCH), and the nSR is 0 in other cases.

5. A base station, comprising:
    at least one hardware processor; and
    a non-transitory computer-readable storage medium coupled to the at least one hardware processor and storing programming instructions for execution by the at least one hardware processor, wherein the programming instructions, when executed, cause the at least one hardware processor to perform operations comprising:
    transmitting data to a user equipment (UE); and
    receiving at least one type of uplink control information (UCI) that is transmitted from the UE through a physical uplink control channel (PUCCH) of a subframe, wherein transmission power of the PUCCH is determined by the UE based on a PUCCH format dependent value, and when the UE transmits acknowledgement/ negative acknowledgement (ACK/NACK) information for the data and periodic channels state information (CSI) using a PUCCH format 3:
  if the PUCCH format 3 is configured to be transmitted through two antenna ports or if a total sum of the ACK/NACK information and the periodic CSI is larger than 11 bits, the PUCCH format dependent value is determined based on the following equation:

$h(nCQI, nHARQ, nSR) = (nHARQ + nSR + nCQI - 1)/3,$
  wherein h(nCQI, nHARQ, nSR) represents the PUCCH format dependent value, nHARQ represents a number of bits of the ACK/NACK information, nCQI represents a number of bits of the periodic CSI, and nSR is 1 or 0; or
    if PUCCH format 3 is configured to be transmitted through a single antenna port and if a total sum of the ACK/NACK information and the periodic CSI is equal to or smaller than 11 bits, the PUCCH format dependent value is determined based on the following equation:

$h(nCQI, nHARQ, nSR) = (nHARQ + nSR + nCQI - 1)/2.$

6. The base station of claim 5, wherein the PUCCH format 3 is a PUCCH format that uses quadrature phase shift keying (QPSK) as a modulation scheme and in which 48 bits can be transmitted.

7. The base station of claim 5, wherein when the UE transmits second ACK/NACK information and a scheduling request (SR) through the PUCCH format 3:
  if a total sum of the second ACK/NACK information and the SR is larger than 11 bits or if the UE is configured to transmit the PUCCH format 3 on two antenna ports, the PUCCH format dependent value is determined based on the following equation:

$h(nCQI, nHARQ, nSR) = (nHARQ + nSR - 1)/3;$ or otherwise, the PUCCH format dependent value is determined based on the following equation:

$h(nCQI, nHARQ, nSR) = (nHARQ + nSR - 1)/2.$

8. A non-transitory computer-readable medium storing instructions which, when executed, cause a computing device to perform operations comprising:
  transmitting data to a user equipment (UE); and
  receiving at least one type of uplink control information (UCI) that is transmitted from the UE through a physical uplink control channel (PUCCH) of a subframe, wherein transmission power of the PUCCH is determined by the UE based on a PUCCH format dependent value, and when the UE transmits acknowledgement/negative acknowledgement (ACK/NACK) information for the data and periodic channels state information (CSI) using a PUCCH format 3:
    if the PUCCH format 3 is configured to be transmitted through two antenna ports or if a total sum of the ACK/NACK information and the periodic CSI is larger than 11 bits, the PUCCH format dependent value is determined based on the following equation:

$h(nCQI, nHARQ, nSR) = (nHARQ + nSR + nCQI - 1)/3,$
    wherein h(nCQI, nHARQ, nSR) represents the PUCCH format dependent value, nHARQ represents a number of bits of the ACK/NACK information, nCQI represents a number of bits of the periodic CSI, and nSR is 1 or 0; or
    if PUCCH format 3 is configured to be transmitted through a single antenna port and if a total sum of the ACK/NACK information and the periodic CSI is equal to or smaller than 11 bits, the PUCCH format dependent value is determined based on the following equation:

$h(nCQI, nHARQ, nSR) = (nHARQ + nSR + nCQI - 1)/2.$

9. The base station of claim 5, wherein the nSR is 1 if a subframe used for transmitting the at least one type of UCI is configured for a scheduling request (SR) for the UE not having any associated transport block for uplink shared channel (UL-SCH), and the nSR is 0 in other cases.

10. The non-transitory computer-readable medium of claim 8, wherein the PUCCH format 3 is a PUCCH format that uses quadrature phase shift keying (QPSK) as a modulation scheme and in which 48 bits can be transmitted.

11. The non-transitory computer-readable medium of claim 8, wherein when the UE transmits second ACK/NACK information and a scheduling request (SR) through the PUCCH format 3:
  if a total sum of the second ACK/NACK information and the SR is larger than 11 bits or if the UE is configured to transmit the PUCCH format 3 on two antenna ports, the PUCCH format dependent value is determined based on the following equation:

$h(nCQI, nHARQ, nSR) = (nHARQ + nSR - 1)/3;$ or otherwise, the PUCCH format dependent value is determined based on the following equation:

$h(nCQI, nHARQ, nSR) = (nHARQ + nSR - 1)/2.$

12. The non-transitory computer-readable medium of claim 8, wherein the nSR is 1 if a subframe used for transmitting the at least one type of UCI is configured for a scheduling request (SR) for the UE not having any associated transport block for uplink shared channel (UL-SCH), and the nSR is 0 in other cases.

* * * * *

UNITED STATES PATENT AND TRADEMARK OFFICE
CERTIFICATE OF CORRECTION

PATENT NO. : 10,912,069 B2
APPLICATION NO. : 16/694779
DATED : February 2, 2021
INVENTOR(S) : Dong Youn Seo et al.

Page 1 of 1

It is certified that error appears in the above-identified patent and that said Letters Patent is hereby corrected as shown below:

In the Specification

In Column 1, Line 13, delete "9,730,199," and insert -- 9,999,035, --, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*